(12) United States Patent
Forslöw

(10) Patent No.: US 6,608,832 B2
(45) Date of Patent: *Aug. 19, 2003

(54) COMMON ACCESS BETWEEN A MOBILE COMMUNICATIONS NETWORK AND AN EXTERNAL NETWORK WITH SELECTABLE PACKET-SWITCHED AND CIRCUIT-SWITCHED AND CIRCUIT-SWITCHED SERVICES

(75) Inventor: Jan E. Forslöw, Menlo Park, CA (US)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,678

(22) Filed: Jul. 23, 1998

(65) Prior Publication Data

US 2003/0039237 A1 Feb. 27, 2003

Related U.S. Application Data

(60) Provisional application No. 60/060,061, filed on Sep. 25, 1997.

(51) Int. Cl.[7] .............................................. H04L 12/66
(52) U.S. Cl. ....................... 370/353; 370/229; 370/328
(58) Field of Search ................................. 370/353, 351, 370/352, 389, 395.1, 400, 401, 402, 354–357, 360, 229, 230–231, 235, 310, 328–329, 335–336, 345, 347, 395.2, 395.21, 395.3, 395.4, 395.42, 395.52, 437, 465, 466, 486, 487; 455/403, 410, 411, 575

(56) References Cited

U.S. PATENT DOCUMENTS 5,790,534 A * 8/1998 Kokko et al. ............... 370/335

(List continued on next page.)

FOREIGN PATENT DOCUMENTS

EP 0 789 499 A 8/1997

(List continued on next page.)

OTHER PUBLICATIONS

H. Schulzrinne et al., Network Working Group, Request for Comments: 2326, Category: Standards Track, Apr. 1998, "Real Time Streaming Protocol".

(List continued on next page.)

Primary Examiner—Douglas Olms
Assistant Examiner—Brian Nguyen
(74) Attorney, Agent, or Firm—Nixon & Vanderhye P.C.

(57) ABSTRACT

Applications running on a mobile station or an external network entity such as an Internet service provider may specify on an individual application flow basis a requested quality of service. From that requested quality of service, an optimal type of bearer to transfer the application flow through the mobile communications network is determined. For example, a circuit-switched bearer may be allocated if the request is for a real-time service, and a packet-switched bearer may be allocated if the request is for a non-real time type of service. Various other decision making criteria may be employed. A mobile station and a mobile network gateway node each include a mapper for mapping an individual application flow to one of a circuit-switched network and a packet-switched network bearer depending on the quality of service requested for the individual application flow. The network layer quality of service parameters corresponding to an individual application flow are mapped to circuit-switched bearer parameters if the application flow is mapped to the circuit-switched network and to packet-switched bearer parameters if the application flow is mapped to the packet-switched network. The gateway node includes a common access server which permits a mobile station initially establishing a communications session with an external network entity to perform only a single, common access procedure for subsequent communications using one of the circuit-switched and packet-switched networks. After that common access procedure is completed, subsequent application flows between the mobile station and the external network entity are established using abbreviated procedures without having to access the external network entity.

60 Claims, 12 Drawing Sheets

U.S. PATENT DOCUMENTS

| | | | | |
|---|---|---|---|---|
| 5,852,718 | A | * 12/1998 | Van Loo | 709/208 |
| 5,991,292 | A | * 11/1999 | Focsaneanu et al. | 370/352 |
| 6,081,517 | A | * 6/2000 | Liu et al. | 370/352 |
| 6,094,581 | A | * 7/2000 | Fried et al. | 455/449 |
| 6,097,733 | A | * 8/2000 | Basu et al. | 370/329 |
| 6,122,263 | A | * 9/2000 | Dahlin et al. | 370/329 |
| 6,157,648 | A | * 12/2000 | Voit et al. | 370/401 |

FOREIGN PATENT DOCUMENTS

| | | |
|---|---|---|
| WO | 95/25407 A | 9/1995 |
| WO | 96/09708 A | 3/1996 |
| WO | 97/47112 A | 12/1997 |

OTHER PUBLICATIONS

C. Rigne, Network Working Group, Request for Comments: 2139, Obsoletes: 2059, Category: Informational, Apr. 1998, "Radius Accounting".

R. Braden et al., Network Working Group, Request for Comments: 2205, Category: Standards Track, RFC 2205, Sep. 1997, Resource ReSerVation Protocol (RSVP)—Version 1 Functional Specification.

R. Droms, Network Working Group, Request for Comments: 2131, Obsoletes: 1541, Category: Standards Track, Mar. 1997, "Dynamic Host Configuration Protocol".

C. Rigney et al., Network Working Group, Request for Comments: 2138, Obsoletes: 2058, Category: Standards Track, Apr. 1997, "Remote Authentication Dial In User Service (RADIUS)".

W. Simpson, Network Working Group, Request for Comments: 1661, STD: 51, Obsoletes: 1548, Category: Standards Track, Jul. 1994, "The Point–to–Point Protocol (PPP)".

H. Schulzrinne et al., Network Working Group, Request for Comments: 1989, Category Standards Track, Jan. 1996, "RTP: A Transport Protocol for Real–Time Applications".

Michael Patrick, DHC Working Group, Nov. 24, 1997, "DHCP Relay Agent Information Option".

A. Valencia et al., PPP Working Group, INTERNET DRAFT, Category: Internet Draft, Title: draft–ietf–pppext–12tp–11.txt, May 1998, "Layer Two Tunneling Protocol 'L2TP".

O. Gudmundsson et al., DHC Working Group, Internet Draft, Mar. 1998, "Security Requirements for the DHCP Protocol".

* cited by examiner

CS and PS Bearer Service Selection

MS-ISP Authentication for CS and PS Services

IP Host Configuration for CS and PS Bearer Services.

COMMON ACCESS BETWEEN A MOBILE COMMUNICATIONS NETWORK AND AN EXTERNAL NETWORK WITH SELECTABLE PACKET-SWITCHED AND CIRCUIT-SWITCHED AND CIRCUIT-SWITCHED SERVICES

RELATED APPLICATION

This application claims priority from U.S. Provisional Patent Application Ser. No. 60/060,061 filed Sep. 25, 1997. This application is also related to commonly-assigned U.S. patent application Ser. No. 09/087,496 filed May 29, 1998, the disclosure of which is incorporated by reference.

FIELD OF THE INVENTION

The present invention relates to mobile communications, and more particularly, to different services and features that may be employed to establish and enhance communications between a mobile station in a mobile communications network and an external network entity.

BACKGROUND AND SUMMARY OF THE INVENTION

The main application of most mobile radio systems like the Global System for Mobile communications (GSM) has been mobile telephony which typically only supports circuit-switched communications where guaranteed, "fixed" circuits are dedicated to a user for the duration of a call. However, packet-switched applications, like facsimile transmission and short message exchange, are becoming popular in mobile networks. Example data applications include wireless personal computers, mobile offices, electronic funds transfer, road transport telemetry, field service businesses, fleet management, etc. These data applications are characterized by "bursty" traffic where a relatively large amount of data is transmitted over a relatively short time interval followed by significant time intervals when little or no data is transmitted.

While bursty traffic can be transmit using a circuit-switched channel, such a transmission underutilizes that channel because there are likely large intervals between bursts when the channel is reserved but is not being used, there is no information to be transmit from or received by the user. From an efficiency view point, this is a waste of transmission resources which are particularly limited for radio communications. However, from a customer service view point, because a circuit-switched channel is not shared with other users, the user is essentially guaranteed a certain quality of service. In addition to inefficiency, it takes a relatively long time to set up and take down a circuit-switched call compared with individual packet routing in packet-switched sessions. In bursty traffic situations, packet-switched bearers better utilize the transmission bandwidth because a communications resource is used only when there is data to transmit. Communication channels are therefore typically shared by many users. Another advantage is that in contrast to time-oriented charging applied for circuit-switched connections, packet-switched data services allow charging depending on the amount of data actually transmitted and on the quality of service of that transmission.

In order to provide such mobile data applications, packet radio network services accommodate connectionless, packet-switched data services with high bandwidth efficiency. One example is the General Packet Radio Service (GPRS) incorporated into the existing circuit-switched GSM network. Another is the Cellular Digital Packet Data (CDPD) network used into the existing D-AMPS network. A significant interest of end users of a mobile packet data service such as GPRS is that wireless PCs support conventional Internet-based applications like file transfer, submission and reception of e-mail, and "surfing" the Internet via the worldwide web. Conferencing and playback applications, including video and multimedia, are also important services to be supported by mobile networks.

Although circuit-switched services are well known in mobile networks, mobile packet-switched services are quite new. Therefore, a brief description of the latter using GSM/GPRS as an example is now provided.

FIG. 1 shows a mobile data service from a user's point of view in the context of a mobile communications system 10. An end user communicates data packets using a mobile host 12 including for example a laptop computer 14 connected to a mobile terminal 16. The mobile host 12 communicates for example with a fixed computer terminal 18 incorporated in a local area network (LAN) 20 through a mobile packet data support node 22 via one or more routers 24, a packet data network 26, and a router 28 in the local area network 20. Of course, those skilled in the art will appreciate that this drawing is simplified in that the "path" is a logical path rather than an actual physical path or connection. In a connectionless data packet communication between the mobile host 12 and fixed terminal 18, packets are routed from the source to the destination independently and do not necessarily follow the same path (although they can).

Thus, independent packet routing and transfer within the mobile network is supported by a mobile packet data support node 22 which acts as a logical interface or gateway to external packet networks. A subscriber may send and receive data in an end-to-end packet transfer mode without using any circuit-switched mode network resources. Moreover, multiple point-to-point, parallel applications are possible. For example, a mobile host like a mobile PC might run at the same time a video conference application, an e-mail application, a facsimile application, a web browsing application, etc. The video conference application would typically require more than one data stream (hereafter referred to as an application flow).

FIG. 2 shows a more detailed mobile communications system using the example GSM mobile communications model that supports both circuit-switched and packet-switched communications and includes a circuit-switched network 35 and a packet-switched network 51. A mobile host 12 including a computer terminal 14 and mobile radio 16 communicates over a radio interface with one or more base stations (BSs) 32. Each base station 32 is located in a corresponding cell 30. Multiple base stations 32 are connected to a base station controller (BSC) 34 which manages the allocation and deallocation of radio resources and controls handovers of mobile stations from one base station to another. A base station controller and its associated base stations are sometimes referred to as a base station subsystem (BSS). The BSC 34 is connected to a mobile switching center (MSC) 36 in the GSM circuit-switched network 35 through which circuit-switched connections are set up with other networks 38 such as the Public Switched Telephone Network (PSTN), Integrated Services Digital Network (ISDN), etc.

The MSC 36 is also connected via a Signaling System Number 7 (SS7) network 40 to a Home Location Register (HLR) 42, a Visitor Location Register (VLR) 44, and Authentication Center (AUC) 46. The VLR 44 includes a database containing the information about all mobile stations currently located in a corresponding location or service area as well as temporary subscriber information needed by the MSC to provide services to mobiles in its service area. Typically, when a mobile station enters a visiting network or service area, the corresponding VLR 44 requests and receives data about the roaming mobile station from the mobile's HLR and stores it. As a result, when the visiting mobile station is involved in a call, the VLR 44 already has the information needed for call setup.

The HLR 42 is a database node that stores and manages subscriptions. For each "home" mobile subscriber, the HLR contains permanent subscriber data such as the mobile station ISDN number (MSISDN) which uniquely identifies the mobile telephone subscription in the PSTN numbering plan and an international mobile subscriber identity (IMSI) which is a unique identity allocated to each subscriber and used for signaling in the mobile networks. All network-related subscriber information is connected to the IMSI. The HLR 42 also contains a list of services which a mobile subscriber is authorized to use along with a current subscriber location number corresponding to the address of the VLR currently serving the mobile subscriber.

Each BSC 34 also connects to the GSM packet-switched network corresponding to GPRS network 51 at a Serving GPRS Support Node (SGSN) 50 responsible for delivery of packets to the mobile stations within its service area. The gateway GPRS support node (GGSN) 54 acts as a logical interface to external data packet networks such as the IP data network 56. SGSN nodes 50 and GGSN nodes 54 are connected by an intra-PLMN IP backbone 52. Thus, between the SGSN 50 and the GGSN 54, the Internet protocol (IP) is used as the backbone to transfer data packets.

Within the GPRS network 51, packets or protocol data units (PDUs) are encapsulated at an originating GPRS support node and decapsulated at the destination GPRS support node. This encapsulation/decapsulation at the IP level between the SGSN 50 and the GGSN 54 is called "tunneling" in GPRS. The GGSN 54 maintains routing information used to "tunnel" PDUs to the SGSN 50 currently serving the mobile station. A common GPRS Tunnel Protocol (GTP) enables different underlying packet data protocols to be employed even if those protocols are not supported by all of the SGSNs. All GPRS user-related data needed by the SGSN to perform routing and data transfer functions is accessed from the HLR 42 via the SS7 network 40. The HLR 42 stores routing information and maps the IMSI to one or more packet data protocol (PDP) addresses as well as mapping each PDP address to one or more GGSNs.

Before a mobile host can send packet data to an external network like an Internet service provider (ISP) 58 shown in FIG. 2, the mobile host 12 has to (1) "attach" to the GPRS network 51 to make its presence known and (2) create a packet data protocol (PDP) context to establish a relationship with a GGSN 54 towards the external network that the mobile host is accessing. The attach procedure is carried out between the mobile host 12 and the SGSN 50 to establish a logical link. As a result, a temporary logical link identity is assigned to the mobile host 12. A PDP context is established between the mobile host and the GGSN 54. The selection of a GGSN 54 is based on the name of the external network to be reached.

One or more application flows (sometimes called "routing contexts") may be established for a single PDP context through negotiations with the GGSN 54. An application flow corresponds to a stream of data packets distinguishable as being associated with a particular host application. An example application flow is an electronic mail message from the mobile host to a fixed terminal. Another example application flow is a downloaded graphics file from a web site. Both of these application flows are associated with the same mobile host and the same PDP context.

Packet-switched data communications are based on specific protocol procedures which are typically separated into different layers. FIG. 3A shows a GPRS "transmission plane" that is modeled with multi-layer protocol stacks. Between the GGSN and the SGSN, the GPRS tunneling protocol (GTP) tunnels the PDUs through the GPRS backbone network 52 by adding routing information to encapsulate PDUs. The GTP header contains a tunnel end point identifier (TID) for point-to-point and multicast packets as well as a group identity (GID) for point-to-multipoint packets. Additionally, a type field that specifies the PDU type and a quality of service profile associated with a PDP context session is included. Below the GTP, the well-known Transmission Control Protocol/User Diagram Protocol (TCP/UDP) and Internet Protocol (IP) are used as the GPRS backbone network layer protocols. Ethernet, frame relay (FR), or asynchronous transfer mode (ATM)-based protocols may be used for the link and physical layers depending on the operator's network architecture.

Between the SGSN and mobile station/host, a SubNetwork Dependent Convergence Protocol (SNDCP) maps network level protocol characteristics onto the underlying logical link control (LLC) and provides functionalities like multiplexing of network layer messages onto a single virtual logical connection, ciphering, segmentation, and compression. A Base Station System GPRS Protocol (BSSGP) is a flow control protocol, which allows the base station system to start and stop PDUs sent by the SGSN. This ensures that the BSS is not flooded by packets in case the radio link capacity is reduced, e.g., because of fading and other adverse conditions. Routing and quality of service information are also conveyed. Frame relay and ATM may be used to relay frames of PDUs over the physical layer.

Radio communication between the mobile station and the GPRS network covers physical and data link layer functionality. The physical layer is split up into a physical link sublayer (PLL) and a physical RF sublayer (RFL). RFL performs modulation and demodulation of the physical waveforms and specifies carrier frequencies, radio channel structures, and raw channel data rates. PLL provides services for information transfer over the physical radio channel and includes data unit framing, data coding, and detection/correction of physical medium transmission areas. The data link layer is separated into two distinct sublayers. The radio link control/medium access control (RLC/MAC) sublayer arbitrates access to the shared physical radio medium between multiple mobile stations and the GPRS network. RLC/MAC multiplexes data and signaling information, performs contention resolution, quality of service control, and error handling. The logical link control (LLC) layer operates above the MAC layer and provides a logical link between the mobile host and the SGSN.

It is important to be able to provide a certain particular communications service with a requested quality. For example, certain multimedia applications or even a simple voice phone call need guarantees about accuracy, dependability, and speed of transmission. In packet-switched communications, "best efforts" are usually employed, and no special attention is paid to delay or throughput guarantees. Generally, quality of service parameters can be characterized qualitatively in three services classes including deterministic (used for hard, real-time application), statistical (used for soft real-time applications), and best effort (everything else where no guarantees are made). Quantitative parameters may include throughput (such as the average data rate or peak data rate), reliability, delay, and jitter corresponding to the variation delay between a minimum and maximum delay time that a message experiences.

In the context of providing quality of service (QoS) in a mobile data communications systems, one QoS approach is to assign a specific priority to each PDP context. But this approach is unsatisfactory. As explained above, each PDP context may have plural application flows, and each application flow may have different needs. For example, real time applications like telephony require a guaranteed, low delay service while image video needs a predictable delay service. More specifically, elastic applications like interactive bursts, interactive bulk transfer, and asynchronous bulk transfer require different degrees of best effort or as soon as possible delay service.

It is an important objective of the present invention to provide quality of service based, radio Internet access in order to support multiple application services including voice, data, and multimedia, where some of the applications may have plural application flows operating simultaneously. In the case of Internet integrated services, important quality of service factors are perceived transport link layer delay, jitter, bandwidth, and reliability. Rather than limiting the quality of service to a single PDP context, the present invention defines a quality of service for each individual application flow as is described below and in the above-identified patent application. In addition, the present invention permits selection of a particular type of transfer mechanism that is best suited to transfer the individual application flow in accordance with its quality of service requirements.

Normally a network technology transfers data only according to one type of transfer mechanism—either circuit-switched or packet-switched—even in the GSM which includes both a circuit-switched and a packet-switched network sharing the same radio access interface. In the present invention an optimal type of mobile communications network transfer service—a circuit-switched transfer service or a packet-switched transfer service—is specified on an individual application flow basis. Circuit-switched services may be selected, for example, for real time (low delay and small jitter) application flows like audio and video. Packet-switched bearers may be selected for non-real time, Internet type data applications such as surfing on the worldwide web, file transfer, e-mail, and telnet, all of which require fast channel access and bursty data transfer capability.

Initially a mobile station registers with the mobile communications network to establish communication with an external network entity such as an Internet service provider (ISP). During that communication, an application may initiate different data streams or flows of an application (hereafter referred to as application flows) between the mobile station and the external network entity. For each application flow, a determination is made whether a circuit-switched or a packet-switched bearer should be established. A bearer "bears" or carries information from the mobile station through the mobile communications network towards the external network entity and carries information from the external network entity through the mobile communications network to the mobile station.

Each application flow may have a corresponding quality of service request. Based on that corresponding quality of service, a determination is made whether a circuit-switched bearer or a packet-switched bearer is better suited to transport the application flow. The quality of service parameters specified by the application for an individual application flow are mapped to corresponding quality of service parameters for the selected one of the circuit-switched or packet-switched bearers. Mobile communication resources for the selected bearer and corresponding quality of service parameters may be reserved in advance for each application flow (the resource reservation approach). Alternatively, the header of each information packet in an application flow may specify a generally recognized class of service which when read determines whether a circuit-switched bearer or a packet-switched bearer carries that packet (the differential services approach).

Various algorithms may be used to determine the type of bearer to be allocated to specific application flows. For example, a determination may be made whether an application flow requests a real time service or a non-real time service. A circuit-switched bearer is allocated if the request is for a real time service, and a packet-switched bearer is allocated if the request is for a non-real time type of service. Other criteria may be employed. For example, a circuit-switched bearer may be allocated if the application flow requests low delay or small jitter per packet, and a packet-switched bearer may be allocated if the application flow requests fast channel access or bursty data transfer capability. Yet another example approach may be to determine for each application flow an amount of information to be sent and/or its flow duration. A circuit-switched bearer may be allocated if a large amount of information is to be sent or if the application flow has a long life-time. Otherwise, a packet-switched bearer would be allocated.

In any bearer allocation approach, it is preferred (but not required) that a packet-switched bearer be employed to carry control information being bursty and brief by nature and because of the fast set up and take down times afforded by packet-switched bearers. On the other hand, if a circuit-switched bearer to a mobile station already exists for an application flow, packet-switched type information can be transferred over the existing circuit-switched bearer (because it is existing) even if that information is more suitable for transfer over a packet-switched type bearer. This approach is used, for example, with mobile stations that cannot terminate simultaneous circuit-switched and packet-switched traffic, e.g., so-called class B GPRS mobile stations.

A significant advantage of the present invention is that applications running on a mobile station or on an external network entity such as an Internet service provider may specify on an individual application flow basis a requested quality of service, and with this information, select the type of bearer to be employed when transferring the application flow through the mobile communications network. Both the quality of service characteristics for an application flow and the type of bearer/transfer mechanism can be selected at the application layer which is advantageous because the application has the best end-to-end perspective of the communication.

The mobile station and a mobile network gateway node each include a mapper for mapping individual application flows to one of the circuit-switched network and the packet-switched network bearers depending on the quality of service requested for an individual application flow. Quality of service parameters corresponding to an individual application flow are also mapped to circuit-switched parameters if the application flow is mapped to the circuit-switched network and to packet-switched parameters if the application flow is mapped to the packet-switched network.

The gateway node includes a common access server which permits a mobile station initially establishing a communications session with an external network entity to perform only a single common access procedure for subsequent communications using either the circuit-switched network or the packet-switched network. After that common access procedure is completed, subsequent application flows between the mobile station and the external network entity are established without having to perform another access procedure involving the external network entity.

The common access procedure includes a common authentication procedure for authenticating the identity of the mobile station with the external network entity. Thereafter, the mobile station is authorized for subsequent application flows with the external network entity for both of the circuit-switched and packet-switched networks. The common authentication procedure includes confirming a mobile station identification and password to determine whether the mobile station is authorized to communicate with the external network entity.

The common access procedure also employs a common configuration procedure for configuring the mobile station with the external network entity. Thereafter, the mobile station is configured with a common network address for subsequent application flows with the external network entity for both of the circuit-switched and packet-switched networks. The common configuration procedure includes providing the mobile station with parameters needed to communicate with the external network entity including the network layer address allocated to the mobile station. The configuration parameters are stored by the common access server so that for subsequent application streams involving the mobile station during the session, the common access server retrieves the stored parameters and configures the subsequent application stream without involving the external network entity.

By permitting individual application flows to individually select (1) quality of service parameters and (2) type of transfer mechanism (either circuit-switched or packet-switched bearer), the present invention provides better service for different types of applications. At the same time, the common access procedure for all application flows in a session provides much faster service. Indeed, authentication and configuration procedures between a mobile station and an Internet service provider may take on the order of twenty to thirty seconds to perform when using a circuit-switched bearer. This significant delay is even more onerous if such access procedures must be performed for each of multiple application flows. Consider the length of the delay associated with a conferencing application that requires simultaneous execution of multiple application flows.

These onerous delays are eliminated in the present invention. At mobile registration, an initial authentication and configuration procedure using a packet-switched bearer is performed in less than half the 20 to 30 seconds noted above. Even more time is saved because this initial authentication and configuration procedure is not performed for each subsequent individual application flow. Instead, abbreviated authentication and configuration procedures are performed for subsequent flows contained within the mobile communications network at the common access server in just a few seconds.

BRIEF DESCRIPTION OF THE DRAWINGS

The foregoing and other objects, features, and advantages of the invention will be apparent from the following description of preferred embodiments as illustrated in the accompanying drawings in which reference characters refer to the same parts throughout the various views. The drawings are not necessarily to scale with emphasis being placed upon illustrating the principles of the invention.

DETAILED DESCRIPTION OF THE DRAWINGS

Figure 1:
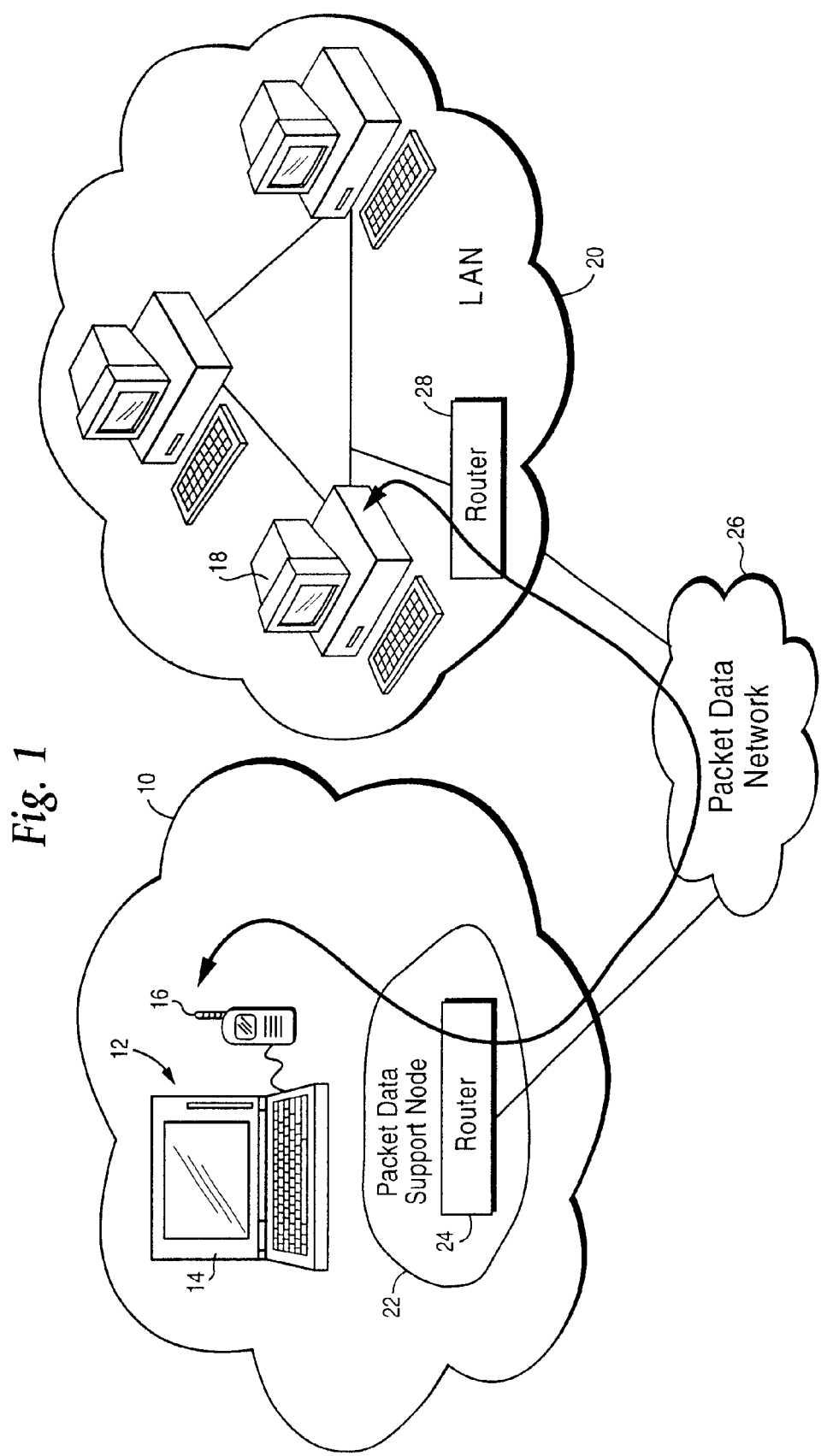
FIG. 1 is a simplified diagram showing a data communication between a mobile host and a fixed host.

In the following description, for purposes of explanation and not limitation, specific details are set forth, such as particular embodiments, hardware, techniques, etc. in order to provide a thorough understanding of the invention. However, it will be apparent to one skilled in the art that the present invention may be practiced in other embodiments that depart from these specific details. For example, while a specific example embodiment of the present invention is described in the context of a GSM/GPRS cellular telephone network, those skilled in the art will appreciate that the present invention can be implemented in any mobile communications system using other mobile data communications architectures and/or protocols. In other instances, detailed descriptions of well-known methods, interfaces, devices, and signaling techniques are omitted so as not to obscure the description of the present invention with unnecessary detail.

As already described above, each application flow includes a corresponding stream of data. In order for a mobile station to communicate with an external network entity such as an Internet service provider (ISP), the mobile station must establish communications with the mobile communications network by using a dial-out, circuit-switched connection or through an authenticated, packet-switched tunnel. The present invention uses the latter approach to initially establish the application session in order to avoid the setup time required for a dial-out call.

In the GSM/GPRS example, the mobile station initiates a packet data protocol (PDP) context activation to register with the mobile communications system and begin a data session. The HLR 42 in FIG. 2 stores a PDP context for each mobile subscriber in corresponding subscription records. The PDP subscription record includes subscribed quality of service profiles/parameters, subscribed-to external networks, a MSid such as IMSI (International Mobile Subscriber Identity), etc. When a mobile station attaches to the GPRS network, the mobile station's subscription record is retrieved from the HLR 42. As a result of PDP context activation, a network layer bearer is established between the mobile station and the gateway GPRS support node (GGSN) 54.

After PDP context activation, a network layer, e.g., IP, host configuration operation is performed to establish a network layer (IP) bearer communication between the mobile host and an external network entity like an ISP. The IP configuration includes assigning a network layer (IP) address to the mobile station, setting default values for worldwide web (WWW) server, domain name server (DNS), an address resolution protocol (ARP) cache, etc. When an IP bearer between the mobile host and the GGSN established in the PDP context activation is extended from the GGSN to the ISP, data packets may then be routed back and forth between the mobile station and end systems at the ISP.

As previously mentioned, one of the important objectives of the present invention is to provide quality of service based, wireless Internet access to support multiple services including voice, data, and multimedia at the same time. An Internet application might request a quality of service specifying one or more of the following factors: perceived transport link layer delay, jitter, bandwidth, and/or reliability. One or more of these quality of service factors, depending upon their values, may be better provided by a specific type of bearer. A circuit-switched bearer is better suited to carrying real time services like voice and video that require low delay and/or small jitter. Traditional Internet data applications such as WWW, file transfer, e-mail, and telnet are better served by packet-switched bearers which are better suited to fast channel access and bursty data transfer.

Figure 4:
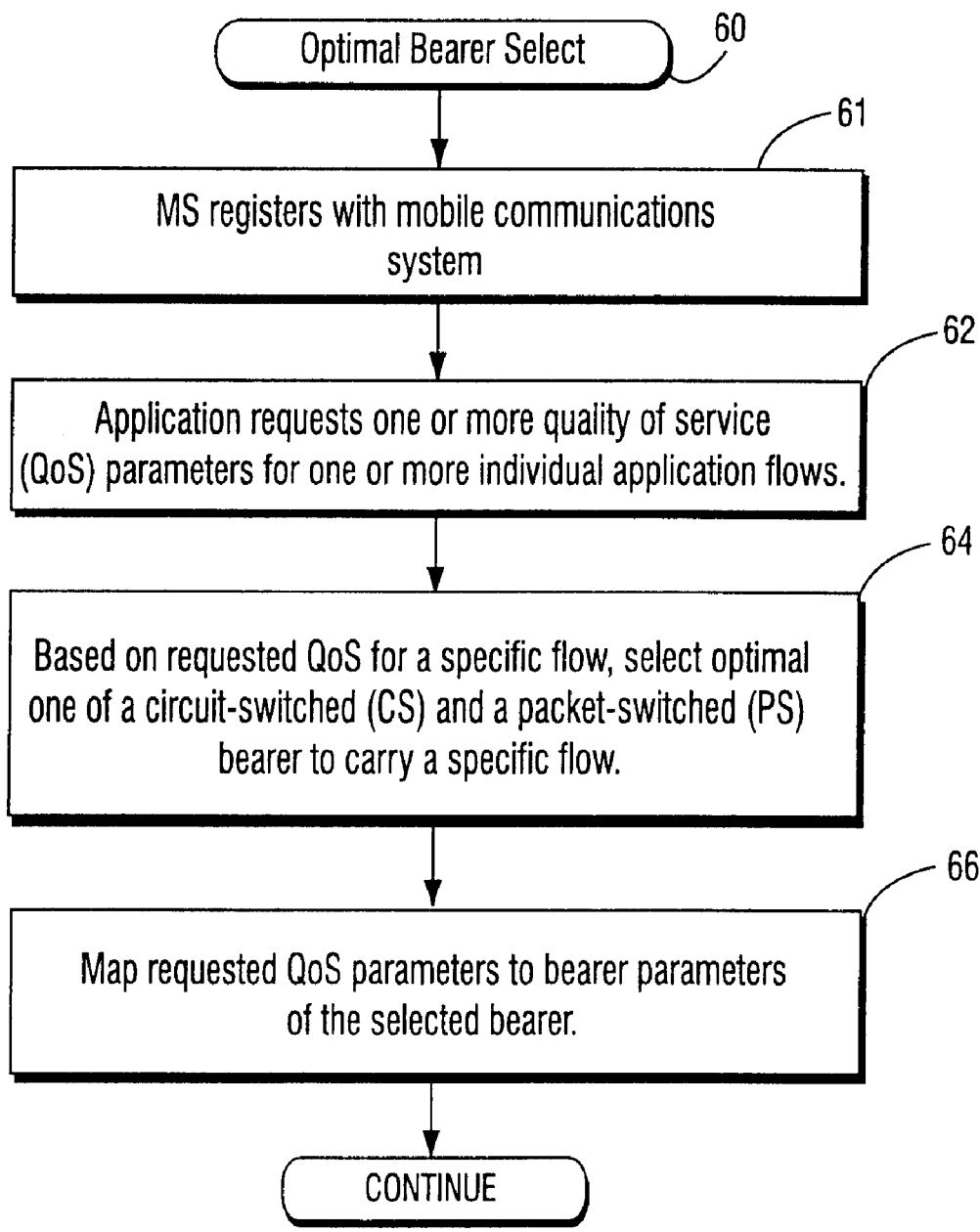
FIG. 4 is a flowchart diagram illustrating optimal bearer selection procedures per application flow in accordance with an example embodiment of the present invention.

The present invention provides considerable flexibility and a wide range of services to mobile subscribers by permitting applications to select for individual application flows a specific quality of service and a specific type of mobile network transfer mechanism (a circuit-switched bearer or a packet-switched bearer) rather than restricting all application flows to a single quality of service and/or a single transfer mechanism. FIG. 4 illustrates an optimal bearer select routine (block 60). Here, it is assumed that the mobile station is already registered with the mobile network using for example the PDP context activation procedures described above (block 61).

Figure 2:
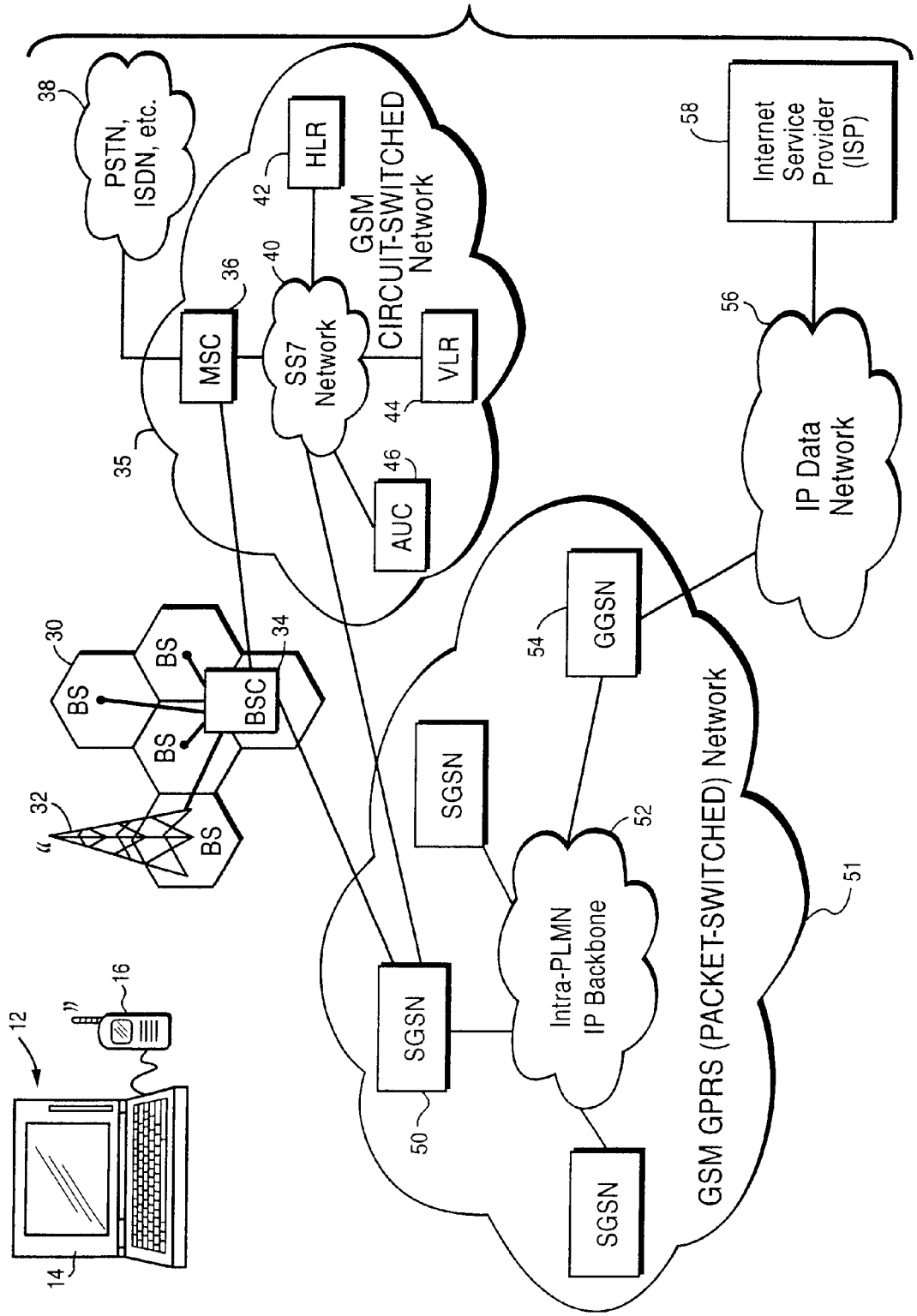
FIG. 2 is a more detailed diagram showing a GSM mobile communications system including a General Packet Radio Service (GPRS) data network.

After registration, plural application flows are communicated between an external network entity like the Internet service provider (ISP) shown in FIG. 2 and the mobile station. An application (such as a multimedia conference) requests one or more quality of service (QoS) parameters for one or more individual application flows (block 62). Based on the requested quality of service for a specific application flow, an optimal one of a circuit-switched and a packet-switched bearer is selected to carry that specific application flow (block 64). The requested quality of service parameters for each application flow including, e.g., peak bit rate, bucket depth (a maximum buffering requirement for the flow), and per packet delay, are then mapped to bearer parameters of the selected bearer including, e.g., in the case of a packet-switched bearer, peak throughput, burst size, and delay class (block 66). As a result, each application stream receives optimal service in terms of the quality of service parameters as well as the type of transfer mechanism best suited to carry the type of information to be transferred in that specific application flow.

In general, a typical application having plural application flows requiring communication between a mobile station and an external network entity like an ISP may follow the following example procedures:

(1) The mobile station registers using a common access procedure for both circuit-switched and packet-switched bearer communications at the ISP using "low cost" packet-switched bearer and full dynamic host configuration support. Thereafter, only an abbreviated authentication and configuration procedure is required for subsequent absolute application flows as is described in more detail below.

(2) The packet-switched bearer service with a predictive quality of service delay class is used to transport application control messages.

(3) The packet-switched bearer service is employed to transfer bulk data with a best effort quality of service delay class.

(4) A low delay quality of service provided by the circuit-switched bearer service is employed to transport audio or video components.

Figure 5:
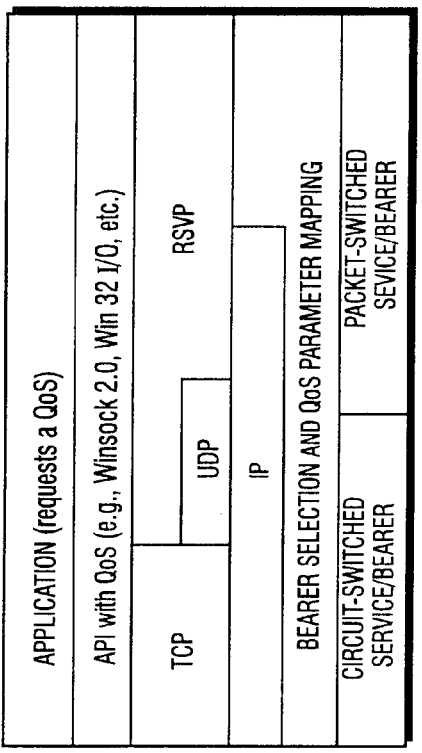
FIG. 5 is a protocol stack diagram depicting an example implementation for mapping an application flow to a specific bearer in accordance with specific quality of service parameters in accordance with the present invention.

FIG. 5 illustrates a protocol model which allows individual application streams to be serviced individually rather than just servicing a single application. The protocol structure shown in FIG. 5 may be implemented in the mobile station and in the mobile communications network gateway node, e.g., a GGSN in the GSM/GPRS example. Assuming that the application (such as a conferencing or playback application) includes control signals as well as plural substantive application flows, the application requests for each application flow (including control signal flow(s) associated with the application) a corresponding quality of service using a quality of service application programming interface (API). WinSock 2.0 or Win32 available from Microsoft are possible choices for a quality of service API.

The quality of service is then mapped towards an IP reservation protocol such as RSVP established by the Internet Engineering Task Force (IETF). Depending on application flow characteristics, a reliable transport protocol (TCP) or an unreliable transport protocol (UDP may be applied. A bearer/link selection and quality of service parameter mapping layer in accordance with the present invention is used to map the RSVP quality of service request either to a circuit-switched bearer supported by the circuit-switched network in the mobile communications system or to a packet-switched bearer supported by the packet-switched network in the mobile communications system.

Once the RSVP quality of service request is mapped to a circuit-switched or packet-switched bearer, the quality of service parameters specified for each individual application flow are mapped to circuit-switched or packet-switched parameters depending upon the bearer type selection. In the circuit-switched network, such quality of service parameter mapping involves, for example, selecting an appropriate number of radio channels (e.g., time slots in a TDMA-based system, spreading codes in a CDMA system, etc.), to correspond to the requested bandwidth. In the packet-switched network, there are multiple options to be considered to support quality of service at different protocol layers.

Figure 3:
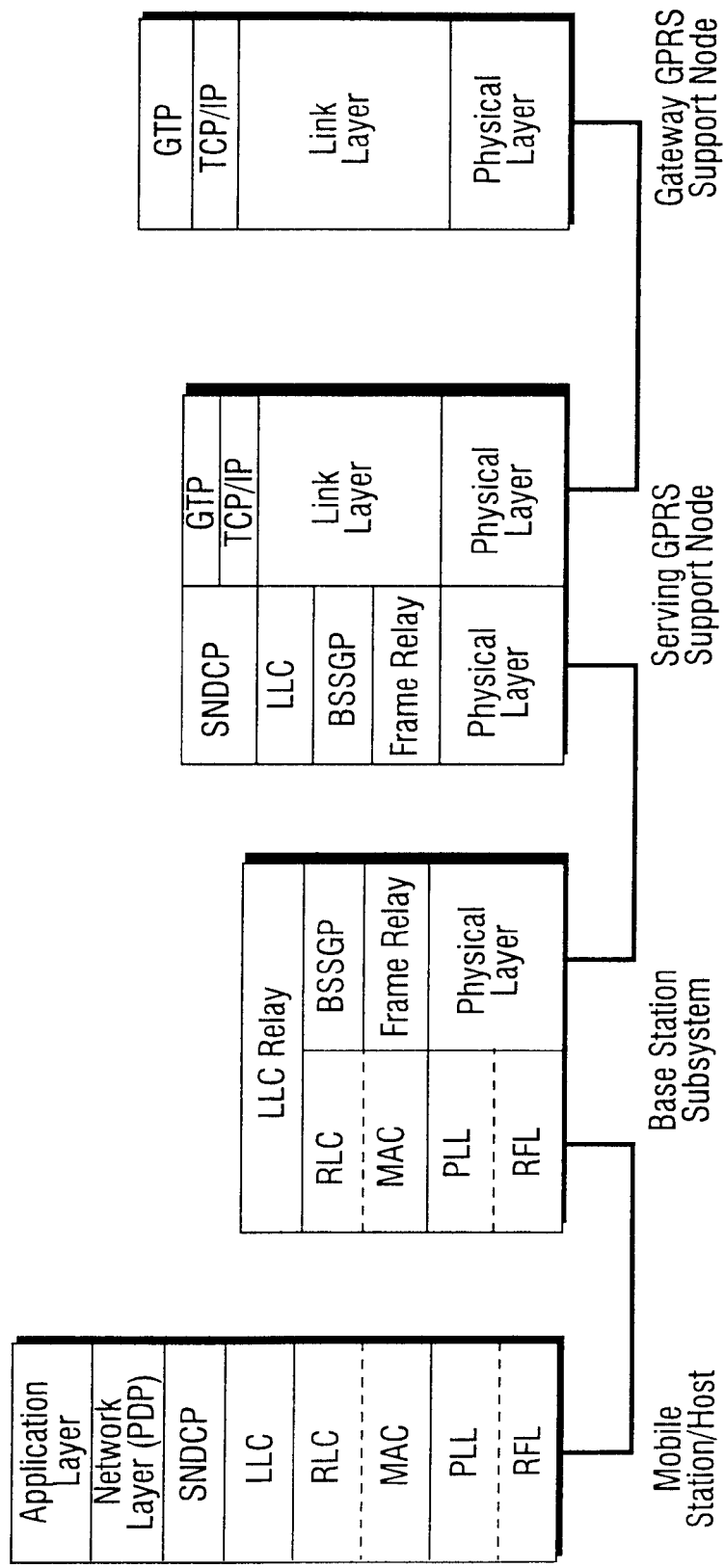
FIG. 3 illustrates example data communication protocols employed between different nodes in the packet-switched, GPRS data communications network in GSM.

A generalized group of quality of service parameters may be defined for a transfer mechanism and is referred to as a bearer quality of service profile. The bearer quality of service profile may be used to define the quality of service at the radio link control layer, the logical link control layer, and at the GPRS tunneling protocol (GTP) layer in the packet-switched bearer in FIG. 3 to thereby establish an end-to-end quality of service. The radio link control layer is influenced by the packet delay and reliability quality of service parameters of the bearer quality of service profile, while the logical link control layer is also influenced by bit rate and precedence/priority information. The GPRS tunneling protocol between the GPRS serving and gateway nodes SGSN and GGSN must ensure that the tunnel does not violate any of the parameters in the quality of service profile. This requirement is normally met because the radio link is the bottleneck of the mobile communication system architecture.

Figure 6:
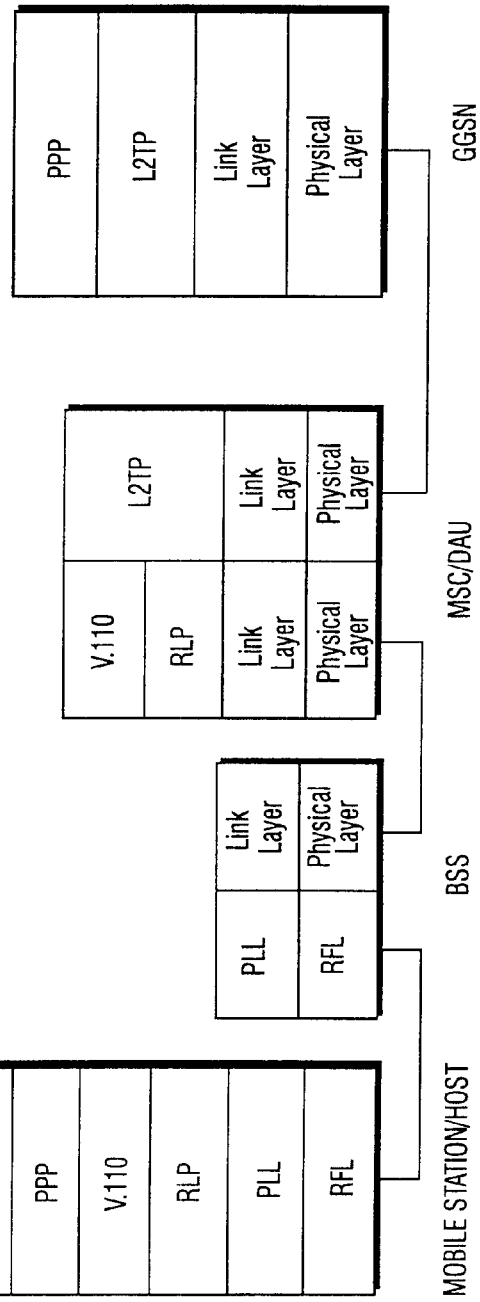
FIG. 6 illustrates example data communication protocols employed between different nodes in a circuit-switched mobile communications network in GSM.

The corresponding layers in the circuit-switched bearer in FIG. 6 are the radio link protocol and the layer 2 tunneling protocol. The radio link protocol is capable of allocating one or several time slots to a mobile station in order to allocate or change the bandwidth of the circuit-switched connection. The radio link protocol also provides a sub-selection of bearer service type within a range of circuit-switched bearers. The bearer service type may be optimized for voice, video, or data, e.g., V.110 is optimized for a data modem as shown in FIG. 6. The bearer service type (voice, video, or data) in the circuit-switched bearer can be seen as a coarse quality of service differentiation as compared to individual QoS parameters for reliability, delay, and precedence as provided in the packet-switched link layer control.

The circuit-switched, layer 2 tunneling protocol essentially has the same role as the GPRS tunneling protocol in the packet-switched bearer—it tunnels a call between the gateway node and the mobile switching center over an IP infrastructure. The control phase in the layer 2 tunneling protocol includes all the information for a normal GSM circuit-switched call. In contrast to the GPRS tunneling protocol which carries IP directly, the layer 2 tunneling protocol carries IP packets in a point-to-point protocol (PPP). The addition of the point-to-point protocol is necessary for fragmentation of packets, authentication of calls, and configuration of terminal functions which are already built into the GPRS tunneling protocol.

Figure 7:
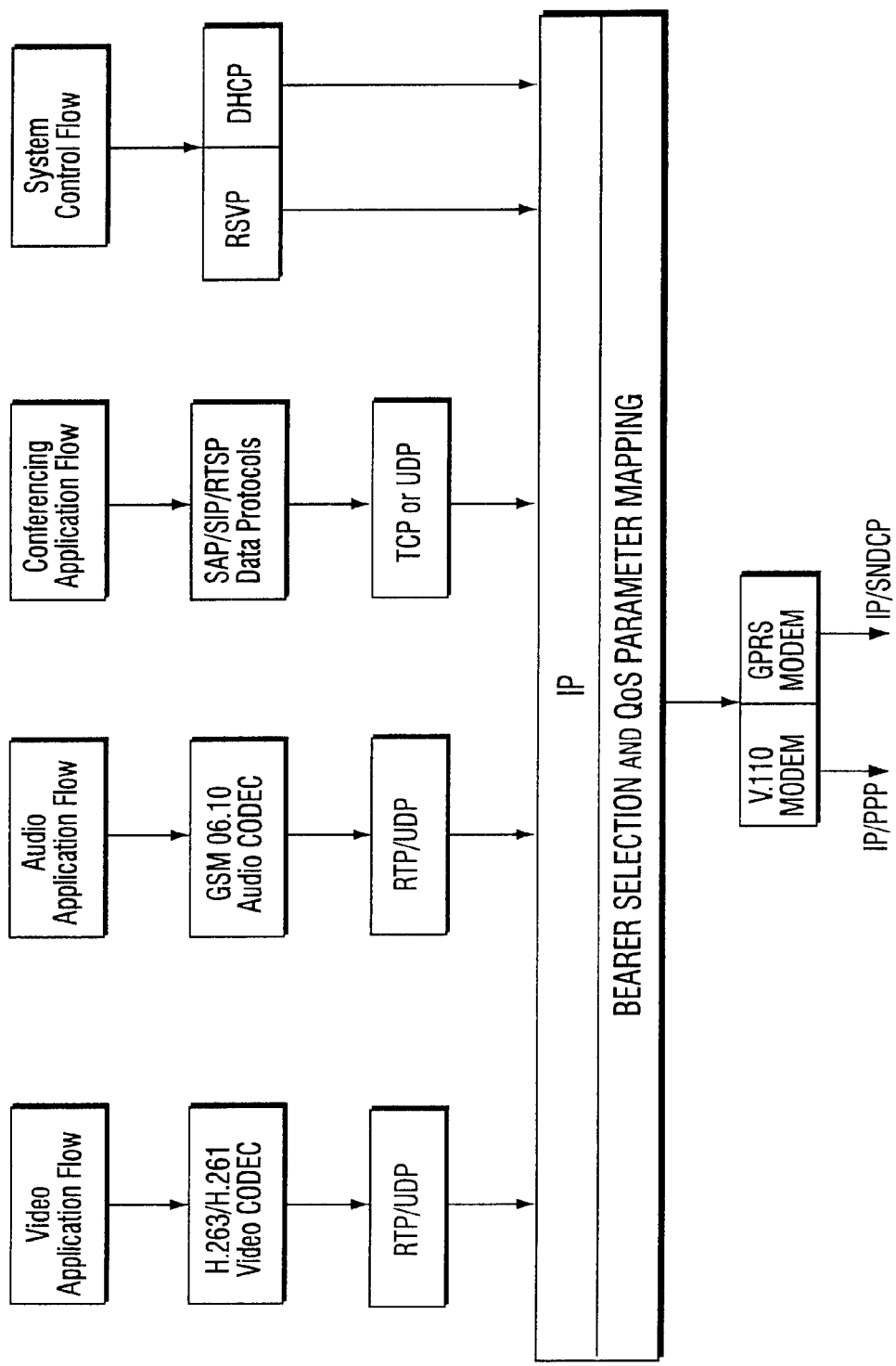
FIG. 7 is a diagram depicting several mobile application flows managed and mapped in accordance with an example embodiment of the present invention.

FIG. 7 is a diagram which depicts a particular mobile application that includes three example application flows including a video application flow, an audio application flow, a conferencing application flow along with a system control operations flow (a total of four application flows). Each flow has a quality of service associated with it recognized on the IP layer. At the transport layer, each application flow uses different coding and messaging protocols as appropriate. The video and audio application flows typically are processed through codecs, e.g., H.263/H.261 for video or GSM 06.10 for audio, and are then encapsulated into the real-time transfer protocol (RTP) for delay-sensitive transport end-to-end. Application flows including control data for application sessions like conference sessions do not require codecs but instead use real-time session control (RTSP), session invitation (SIP), and session announcement (SAP) protocols. These protocols are further encapsulated into UDP or TCP to build a total transport layer. The last "application flow" relates to the system control and relies on transport protocols that handle the resource reservation of the other flows, e.g., RSVP, and the dynamic configuration of the mobile station, e.g., DHCP.

Rather than using a multiplexer, e.g., H.223, which multiplexes all of the four application flow types for transport by one type of bearer, e.g., a circuit-switched bearer like a V.110 modem, the present invention provides a bearer selection and quality of service parameter mapping layer which selects for each application flow at the IP layer the best suited one of a circuit-switched bearer and a packet-switched bearer. In this example depiction in FIG. 7, a circuit-switched bearer is shown as a V.110 modem employing an IP/PPP protocol, and a packet-switched bearer is shown as a GPRS modem employing IP over SNDCP protocol. A circuit-switched modem connection is established by dialing a telephone number to establish a dedicated connection where individual IP packets are not routed. Point-to-point protocol (PPP) is an encapsulation protocol used to carry IP packets over any serial line, dial up connections and therefore is well suited for circuit-switched bearers. Conversely, the GPRS modem routes each IP packet based on its header information. The subnetwork dependence convergence protocol (SNDCP) provides segmentation and compression of headers and data between the mobile station and the SGSN in the GPRS. The SNDCP is specifically developed to carry IP packets directly thereby avoiding PPP.

Figure 8:
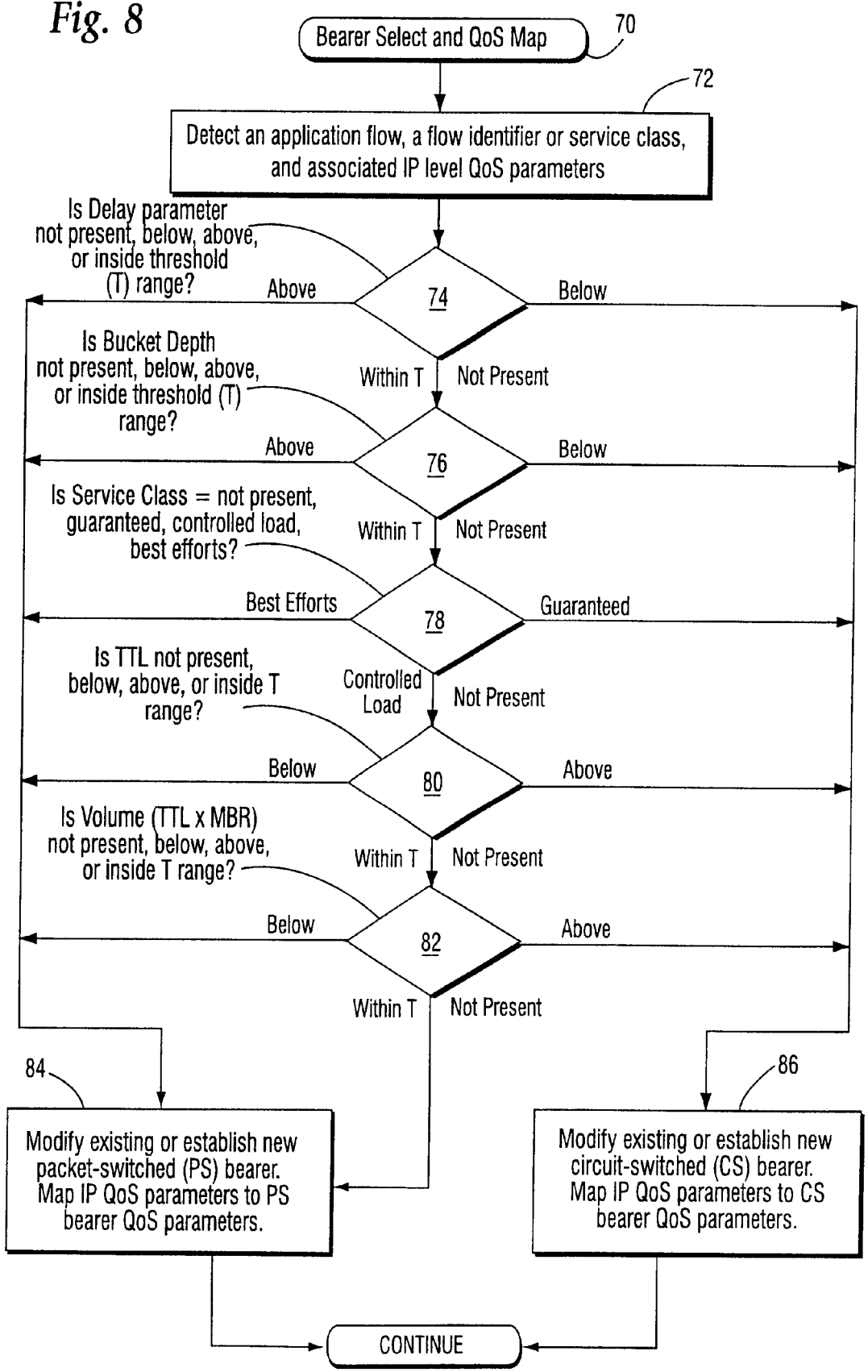
FIG. 8 is a flowchart diagram illustrating sample priority decisions for selecting a bearer and corresponding QoS bearer parameters for an application flow in accordance with an example embodiment of the present invention.

In a preferred, more specific, but still example embodiment of the present invention, the selection of a particular type of bearer and the mapping of quality of service parameters may be performed in accordance with different prioritized criteria as is now described in conjunction with the Bearer Select and QoS Map routine (block 70) shown in function block format in FIG. 8. Initially, an individual application flow is detected along with a corresponding application flow identifier or an associated quality of service class. In the resource reservation embodiment, an individual application flow may specify and reserve beforehand desired, IP level quality of service parameters. Alternatively, in the differentiated services embodiment, a predefined new service class may be associated with an individual application flow; all of the packets within that application flow are then processed according to that quality of service class. The resource reservation approach permits greater flexibility to select different IP level quality of service parameters. The differentiated services approach, the predefined quality of service parameters associated with each general service class are easier to administer.

Some of the specified IP level quality of service parameters, may be accorded more significance than others. For example, in block 74, a decision is made whether an IP quality of service parameter corresponding to packet delay is not present, or if present, whether it is below, above, or inside a threshold (T) range. Delay in this example is the parameter accorded greatest significance. If the delay parameter is present and above the threshold, a new packet-switched (PS) bearer is established. If a packet-switched bearer is already established, the existing packet-switched bearer may be modified to accommodate the newly-detected delay parameter (block 84). Accordingly, the IP quality of service parameters are mapped to packet-switched bearer quality of service parameters. On the other hand, if the associated delay parameter is below the threshold range, a new circuit-switched (CS) bearer is established or an existing circuit-switched bearer is modified to accommodate the newly detected delay parameter (block 86). Similar to the mapping function in block 84, the IP requested IP quality of service parameters are mapped to corresponding circuit-switched bearer quality of service parameters.

Thus, if the application flow can tolerate a large amount of delay, a packet-switched bearer is selected. If little or no delay can be tolerated, a circuit-switched bearer is selected. However, if the detected delay parameter is within the threshold range or is not present, a decision is made whether a next lower priority quality of service parameter—in this example to bucket depth (corresponding to a buffer size required to store the message to be transmitted)—is either not present, below, above, or inside a threshold range. If the bucket depth is present and above the threshold range, the packet-switched bearer functions are selected (block 84). If the bucket depth is below the threshold range, the circuit-switched bearer procedures are selected (block 86). Bucket depth can be analogized to a burstiness quality of the application flow. A very bursty application flow is more suitably carried by a packet-switched bearer. Conversely, an application flow with little or no burstiness (i.e., continuous) is more suited for a circuit-switched bearer.

If the bucket depth parameter is not present for that application flow or is within the threshold range, another decision is made in block 78 whether a service class is specified for this particular application flow. If a best efforts service class is specified, a packet-switched bearer is selected in accordance with the procedures of block 84. If a guaranteed service class is present, the circuit-switched bearer procedures in block 86 are selected. However, if a service class is not specified or a "controlled load" (i.e., somewhere between best efforts and guaranteed type of service) is present, a decision is made in block 80 whether a time-to-live (TTL) parameter is either not present, below, above, or inside a threshold range. If the application has a short time-to-live, a packet-switched bearer is selected in accordance with the procedures in block 84 to eliminate connection setup times associated with a circuit-switched bearer and hopefully communicate the data before its life expires. On the other hand, if the time-to-live parameter is above the threshold range, a circuit-switched bearer is selected in accordance with the procedures outlined in block 86 since the application flow has sufficient life to wait for a circuit-switched bearer to be established.

If the time-to-live parameter is not present or is within the threshold range, a decision is made in block 82 whether the application flow volume (which can be determined by multiplying the time to live parameter by a mean bit rate (MBR)) is not present, below, above, or inside a threshold range. If the flow volume is below the threshold range indicating a fairly small volume, a packet-switched bearer is more optimal and block 84 is selected. Alternatively, if there is a large volume of data, it is more optimal to select a circuit-switched bearer in accordance with the procedures of block 86. For purposes of simplifying the description, if the volume is within the threshold or otherwise not present, a default decision is made to select a packet-switched bearer. Of course, those skilled in the art will appreciate that other quality of service parameters may be queried in similar fashion.

Both blocks 84 and 86 indicate mapping of quality of service to a particular bearer quality of service parameters.

An example of mapping IP Quality of Service (QoS) parameters to packet-switched QoS parameters (such as those used in the GPRS) follows:

| IP QoS Parameter | PS QoS Parameter |
|---|---|
| peak bit rate | peak throughput |
| mean bit rate | mean throughput |
| time to live (TTL) | mean throughput |
| bucket depth | burst size |
| total packet delay | delay class |
| service class | reliability class |
| service class | precedence class |

A similar example quality of service mapping is provided for circuit-switched bearers:

| IP QoS Parameter | CS QoS Parameter |
|---|---|
| service class | bearer service type |
| peak bit rate | number of time slots |
| mean bit rate | number of time slots |

Figure 9:
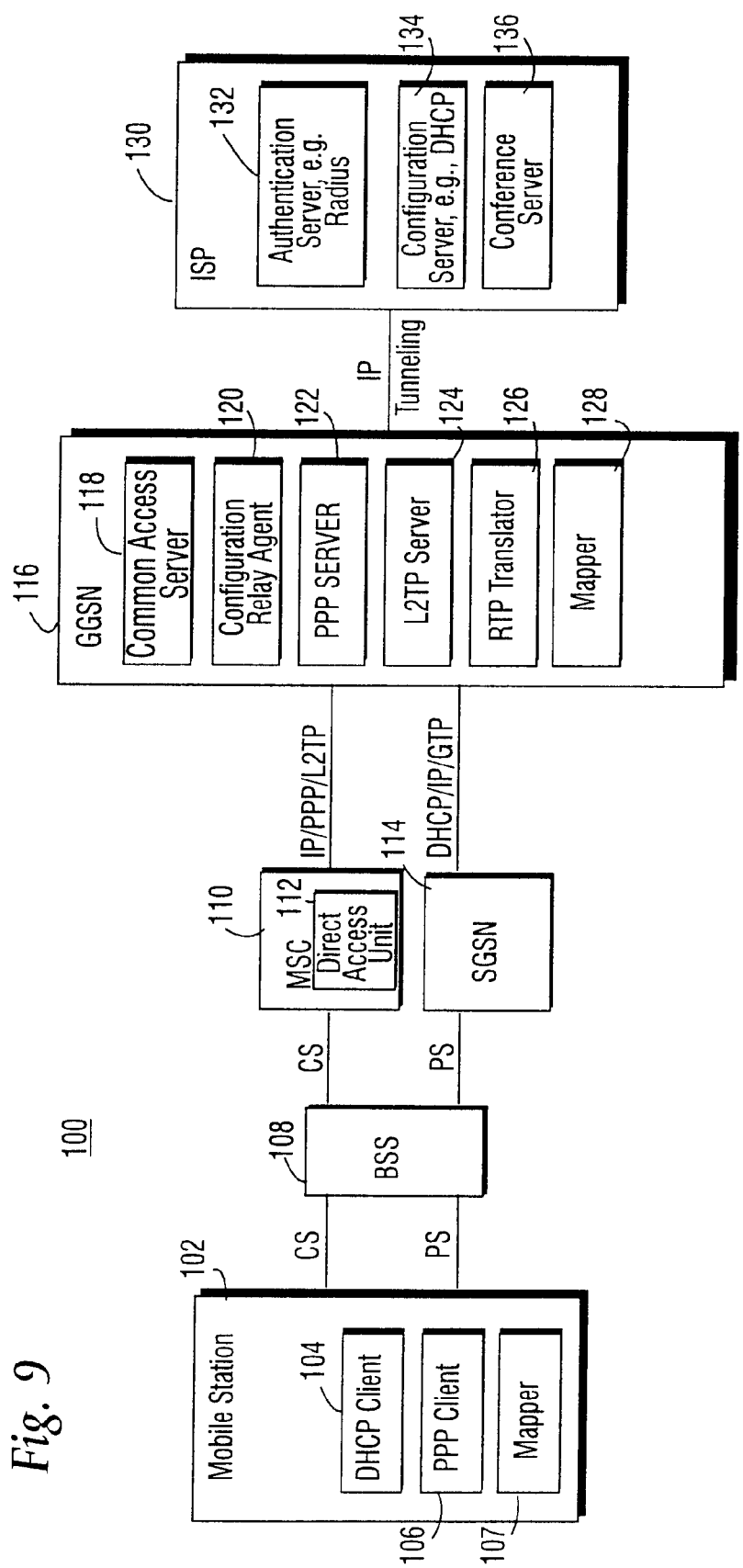
FIG. 9 is a function block diagram illustrating an example implementation of the present invention in a GSM/GPRS mobile communications system.

Reference is now made to FIG. 9 which shows in function block format a mobile communications system, based on the example GSM/GPRS model, in which an example embodiment of the present invention is employed. Mobile communications system 100 includes a mobile station 102 that includes a dynamic host configuration protocol (DHCP) client 104, a point-to-point protocol (PPP) client 106, and a bearer selection and quality of service parameter mapper 107. Mobile station 102 is connected (via a circuit-switched and/or packet-switched bearer) over the radio interface to a base station subsystem (BSS) 108. The BSS includes the base station communicating with the mobile station coupled to its base station controller. As is shown in FIG. 2, the base station controller in the BSS 108 routes circuit-switched communications over a circuit-switched bearer to a direct access unit (DAU) 102 in the MSC 110 in the GSM circuit-switched network 35 and packet-switched communications over a packet-switched bearer to the SGSN 114 in the GSM packet-switched (GPRS) network 51. The direct access unit 102 terminates the radio link protocol and the V.110 modem call. As instructed by the HLR conveyed via the MSC, the DAU 102 creates the layer 2 tunnel towards the GGSN. The DAU 102 determines to which specific GGSN to establish the L2TP tunnel using the external entity telephone number and subscription information retrieved from the HLR such as the mobile's IMSI.

For calls originating from the mobile station, the selections of network and network bearer for application flows originating from the mobile station 102 are made by the mobile's mapper 107. Circuit-switched bearers are transferred to an external network gateway node corresponding in the example embodiment to the GGSN 116 using IP/PPP/L2TP protocols. The IP tunnel is created at the V.110 modem connection terminated by the direct access unit. The term "layer 2 tunnel over IP" means that the L2TP protocol, which carries the end-to-end IP traffic, also utilizes an underlying IP network as the transport mechanism between the direct access unit and the GGSN.

The packet-switched application flows are transferred using DHCP/IP/GPRS tunneling protocol. DHCP is only applied at configuration time. Subsequent IP packets (after configuration) are carried directly on the GPRS bearer. The GPRS tunneling protocol (GTP) encapsulates the end-to-end IP packets between the serving and gateway node, and similar to L2TP, utilizes the underlying IP network as the transport mechanism between the GPRS serving and gateway nodes. Accordingly, both circuit-switched and packet-switched data from the MSC 110 and the SGSN 114, respectively, to the GGSN 116 is by way of IP tunnels. The use of IP as a transport mechanism provides flexible and scalable implementation of the mobile communications backbone using the Internet as the base.

The GGSN 116 includes a common access server 118, a configuration relay agent 120, a PPP server 122, an L2TP server 124, an RTP translator 126, and a mapper 128 similar to the mapper 107 shown in mobile station 102. The common access server 118 is in charge of the interface to the external network entity and uses remote authentication protocols, such as RADIUS, to interact with an external network entity when it comes to allowing or disallowing the mobile station communication to reach the destination in the external network. The RADIUS protocol, (or other security negotiation protocol), may be used in order to agree with the external network entity on security measures for the transport mechanism between the common access server in the GGSN and the entry point at the external network entity.

The configuration relay agent 120 relays the DHCP messages between the DHCP client in the mobile station and the DHCP server in the external network at configuration time. The configuration relay agent 120 specifically obtains the IP address allocated to the mobile station and uses it for subsequent configuration of other mobile communications bearer services, e.g., via PPP. The configuration relay agent 120 also adds a security measure to the configuration by applying identifier checks on all information between the DHCP client and server.

The PPP server 122 terminates the PPP link established over the circuit-switched mobile communications bearer from the mobile station to the GGSN. Specifically, the PPP server 122 terminates the authentication and configuration requests from the mobile station for the circuit-switched bearer and uses information from the common access server 118 and the configuration relay agent 120 to answer the requests from the mobile station.

The L2TP server establishes and terminates "virtual calls" over the IP network between the GGSN and the direct access unit 112 in the MSC 110. A virtual call contains the same information and has the same duration as an actual circuit-switched call between the direct access unit 112 and the mobile station. The RTP translator 126 performs a translation of coding schemes between that applied in the high-speed network between the GGSN and the external network entity and a coding scheme more optimally suited to the low-speed radio network in GSM. The RTP translator 126 can be provided with a user profile for each mobile user, e.g., via RADIUS, in order to perform tailored RTP translation for a specific mobile station. The RTP translation functionality increases the likelihood that two entities can communicate with each other.

The mapper 128 performs the link layer selection and QoS mapping functions per individual application flows. More specifically and as described earlier, the mapper 128 decides whether an application reservation request shall be mapped to a circuit-switched or to a packet-switched mobile communications bearer and translates quality of service parameters from an application "view" to a mobile communications bearer "view." However, the mapper may change the link layer bearer selection per packet in certain situations.

One such situation is where a class B mobile has already established a circuit-switched connection and during that circuit-switched connection also receives packet data. As mobile data communications evolve, there will likely be different classes of mobile stations with different capabilities. For example, the GSM currently defines three different classes of mobiles: Class A, class B, and class C. A class A mobile can make and/or receive traffic on both circuit-switched and packet-switched bearers simultaneously. A class B mobile supports simultaneous activation and monitoring of circuit-switched and packet-switched services but can only send or receive traffic corresponding to application flows on one type of bearer at one time. A class C mobile is the least flexible and supports only transceiving traffic on one type of bearer. In that situation where the class B mobile has established a circuit-switched connection, the mapper 128 also forwards the data over this same circuit-switched bearer rather than waiting to establish a packet-switched bearer when the circuit-switched bearer is released.

The GGSN 116 is connected with an Internet service provider (ISP) using IP tunneling or link layer permanent virtual circuits. IP tunneling is preferred from a scalability viewpoint as the IP tunnel only has to be configured at the endpoints of the tunnel, i.e., in the GGSN and the external network entity, while a permanent virtual circuit must be configured in each intermediate node as well. However, in certain cases the built-in security in asynchronous transfer mode (ATM) and frame relay (FR) permanent virtual circuits may be preferred compared to more vulnerable IP tunnels.

The Internet service provider includes an authentication server 132, a configuration server 134, and a conference server 136. The example authentication server, assumed for purposes of description only, is a remote authentication dial-in user service (RADIUS) server which is a protocol for authentication, authorization, configuration, and accounting between the common access server 118 in the GGSN and the ISP 130. The example configuration server used for the following description is a DHCP server which passes configuration information between hosts in a TCP/IP network. The example application server used for the following description is a conference server 136 acting as a gatekeeper for the overall conference. The gatekeeper conference server 136 maintains records on who is participating in the conference and with what type of application flows.

Both packet-switched and circuit-switched bearer services share the same accounting relationship with the ISP. For example, the RADIUS server maintains a single data record for a mobile station. The data record accumulates accounting information for both types of bearer services keyed to an accounting record identifier corresponding to the mobile's MSid.

Figure 10:
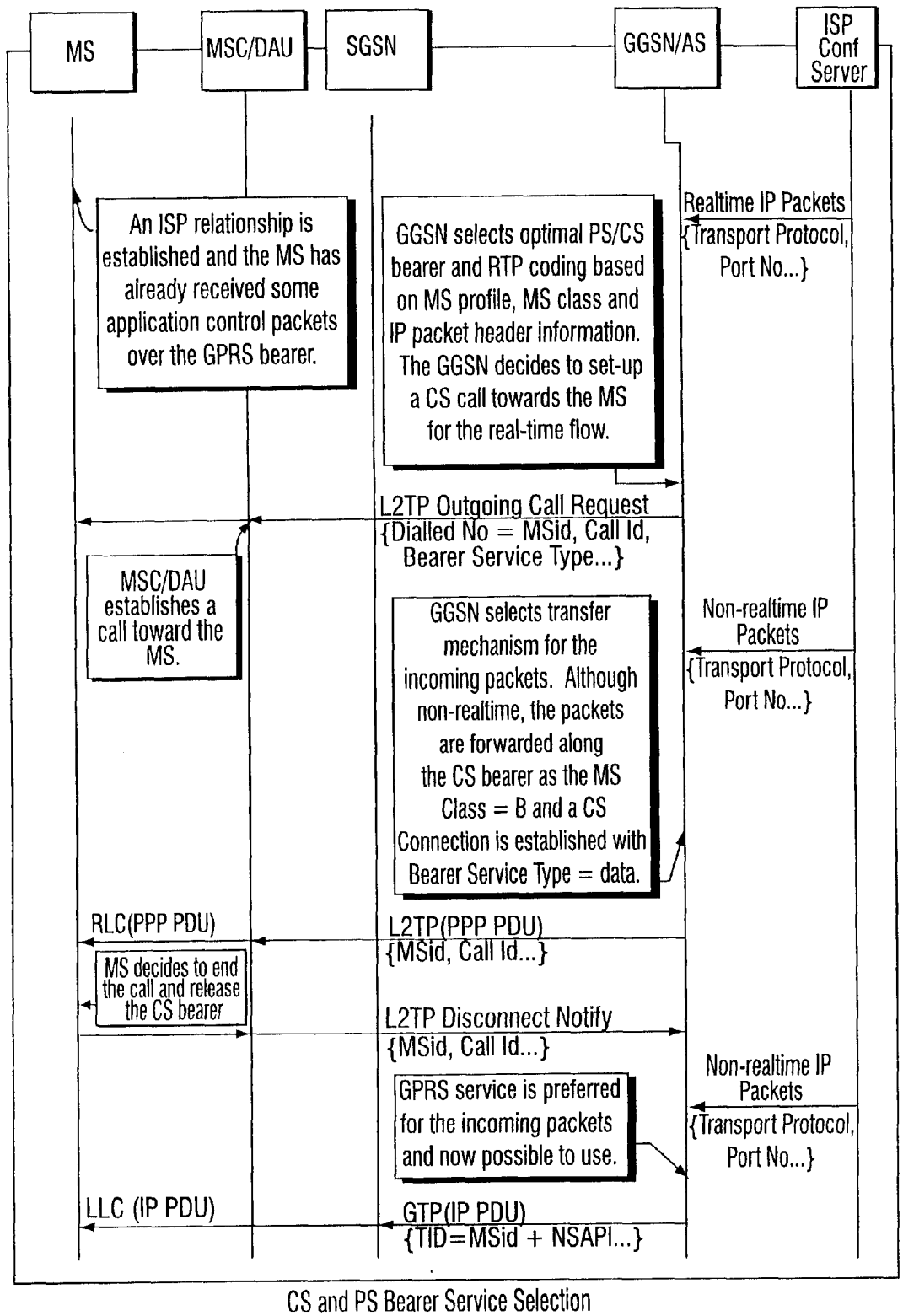
FIG. 10 is a messaging sequence showing example application flows where both circuit-switched and packet-switched bearer services are selected.

FIG. 10 shows example message signaling between various nodes of the communications system shown in FIG. 9 in which an optimal circuit-switched or packet-switched bearer service is selected for different application flows. An ISP relationship is assumed to have already been established between the mobile station and the ISP conference server, and the mobile station has already received some application control packets over a packet-switched bearer. In this example, the ISP conference server 136 now sends IP packets corresponding to a real time application flow from the conference towards the mobile station which are received by the GGSN in the mobile communications system. The GGSN selects the optimal packet-switched or circuit-switched bearer and other parameters such as coding and/or compression rates.

In this example, the RTP translator 126 in the GGSN 116 modifies the coding of the stream from the higher speed conference server 136 to the lower speed mobile communications network based on the mobile station profile and the current RTP coding shown in the packet header. Based on the real-time characteristics of the incoming flow, a circuit-switched bearer is established. The mobile station profile can be administratively configured, set by the authentication (RADIUS) server, or defined by some other user interface. The GGSN uses the mobile station profile in order to select the optimal coding and bearer service for each application flow as explained above in FIG. 8. The GGSN uses the mobile station class along with the bearer service type to switch between packet-switched and circuit-switched bearer services for class B mobiles.

Returning to FIG. 10, in response to the real-time IP packets received from the ISP conference server, the GGSN initiates a circuit-switched application flow via L2TP or a packet-switched application flow via GTP depending upon the optimal bearer selection. The GTP protocol between the SGSN and the GGSN is "extended with" the MS class parameter which allows the GGSN to determine if the mobile station is a class A, B, or C mobile. As described earlier, the GGSN applies special rules for class B mobiles.

Assuming a circuit-switched bearer is selected based on the real-time characteristics of the incoming packets, the GGSN sends an L2TP Outgoing Call Request that includes the dialed telephone number corresponding to the MSid (the mobile is being called in this example), a Call ID, and a circuit-switched bearer service type. The circuit-switched, virtual call is received by the direct access unit 112 at the mobile switching center which establishes a circuit-switched call with the mobile station over the radio link.

In this example, while the circuit-switched bearer is still established, the GGSN merges IP packets from non-real time application flows with the real time traffic flow. Even though these non-real time packets are better suited for a packet-switched bearer, the GGSN forwards the IP packets along the already established circuit-switched bearer because the mobile is a class B mobile and can only support one type of bearer at one time. The non-real time packets, (i.e., protocol data units (PDUs)), are sent as point-to-point protocol frames over the L2TP tunnel on the circuit-switched bearer to the direct access unit at the MSC which relays those PDUs to the mobile station over a circuit-switched type radio link.

The mobile station then decides to end the call and releases the circuit-switched bearer. The mobile sends via the direct access unit a Disconnect Notify message over the L2TP tunnel to the GGSN which effects the circuit-switched bearer release. Subsequently, the ISP conference server sends non-real time IP packets toward the mobile. Since there is no existing circuit-switched bearer, the GGSN determines that a packet-switched bearer service is more optimal for non-real time type packets and establishes a packet-switched bearer to carry the packets to the mobile station. In particular, a packet switched tunnel is established between the GGSN and the SGSN over the GTP tunnel carrying the IP packets along with a corresponding tunnel identifier (TID). The SGSN then establishes a logical data link (logical link control (LLC)) between the SGSN and the mobile station and forwards the packets on a best efforts basis to the mobile station.

One of the significant advantages of the present invention is that it employs a common access procedure for both circuit-switched and packet-switched bearer services between the mobile station and the Internet service provider. This common access procedure is performed using a "low cost" packet-switched bearer and includes a common authentication procedure and a common configuration procedure. After the common access procedure is completed at initial registration, subsequent application flows are authorized and configured using a very brief procedure that does not require contact with the ISP.

Figure 11:
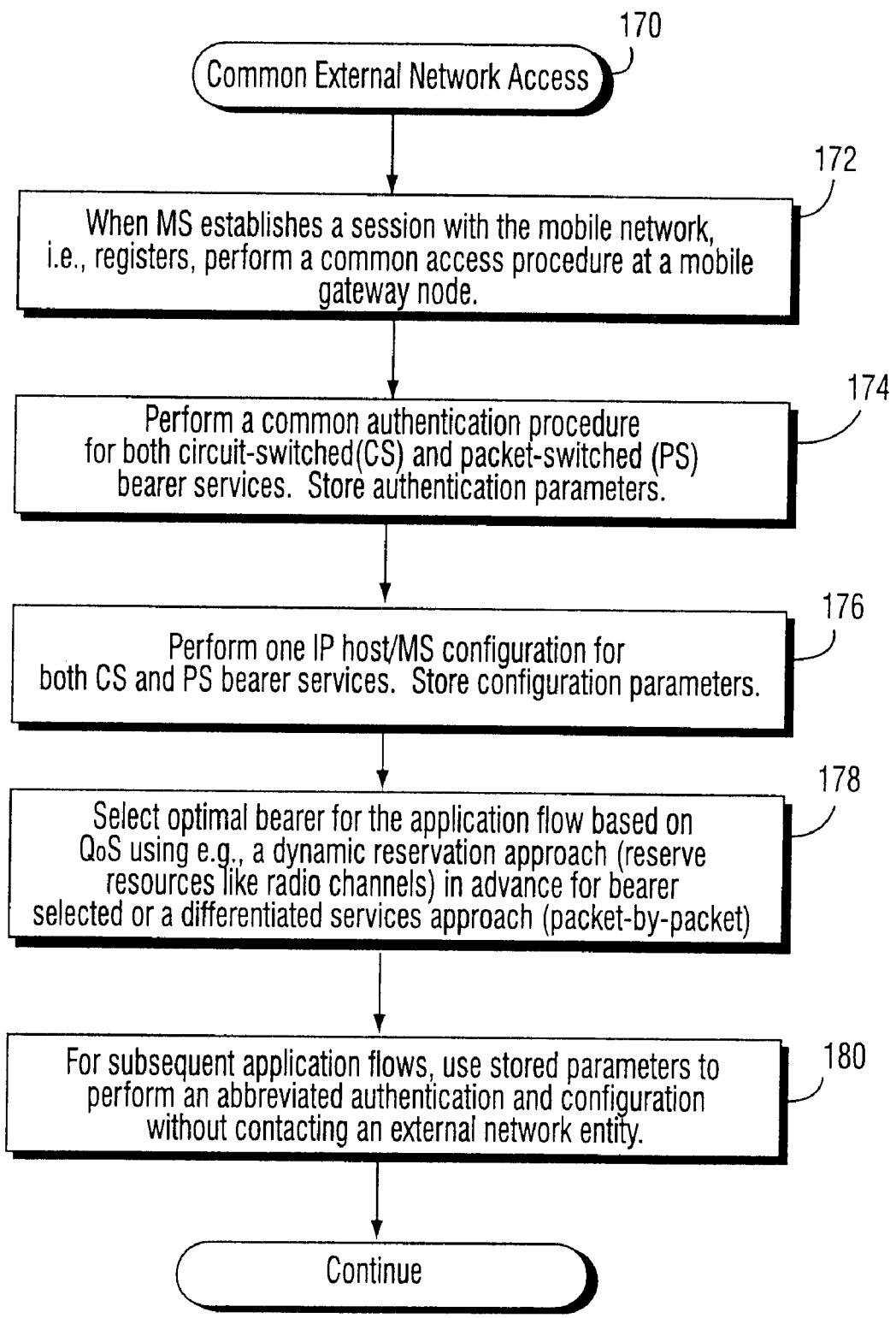
FIG. 11 is a flowchart diagram illustrating common external network access procedures in accordance with an example embodiment of the present invention.

FIG. 11 shows example procedures for a common external network access routine (block 170) in accordance with another aspect of the present invention. When the mobile station establishes a session with the mobile communications network, only a single common access procedure is performed providing the mobile station access to both circuit-switched and packet-switched services (block 172). In particular, only one authentication procedure is performed with one or more authentication parameters, e.g., MSid, Userid, password, etc., resulting from that procedure being stored for subsequent use (block 174). The common access procedure also includes performing only a single ISP-to-mobile station host configuration procedure for both circuit-switched and packet-switched bearer services with the resulting configuration parameters also being stored for subsequent use (block 176).

The best-suited type of mobile network bearer is selected for each application flow, as described above, using a dynamic reservation approach or a differentiated services approach (block 178). In the dynamic reservation approach, communication resources like radio channels are reserved in advance for a selected bearer providing QoS parameters specifically requested for that bearer. In the differentiated services approach, each packet header is analyzed to determine whether the header specifies one of several general classes of service that indicates transport by a circuit-switched bearer or a packet-switched bearer. In the present example, the dynamic reservation approach is preferred. For subsequent application flows involving this mobile station, the stored authentication and configuration parameters are employed to perform an abbreviated (fast) authentication and configuration without having to involve the external network entity (block 180).

The common external network access procedure is advantageously performed just once for all application flows after the initial registration is completed. That common authentication and configuration procedure is performed using a packet-switched bearer in less than half the typical time required by conventional registration procedures using circuit-switched bearers. Even more time is saved because the initial authentication and configuration procedure need not be performed for each subsequent individual application flow. Instead, abbreviated authentication and configuration are performed for subsequent flows within the mobile communications network at the common access server in just a few seconds.

Figure 12:
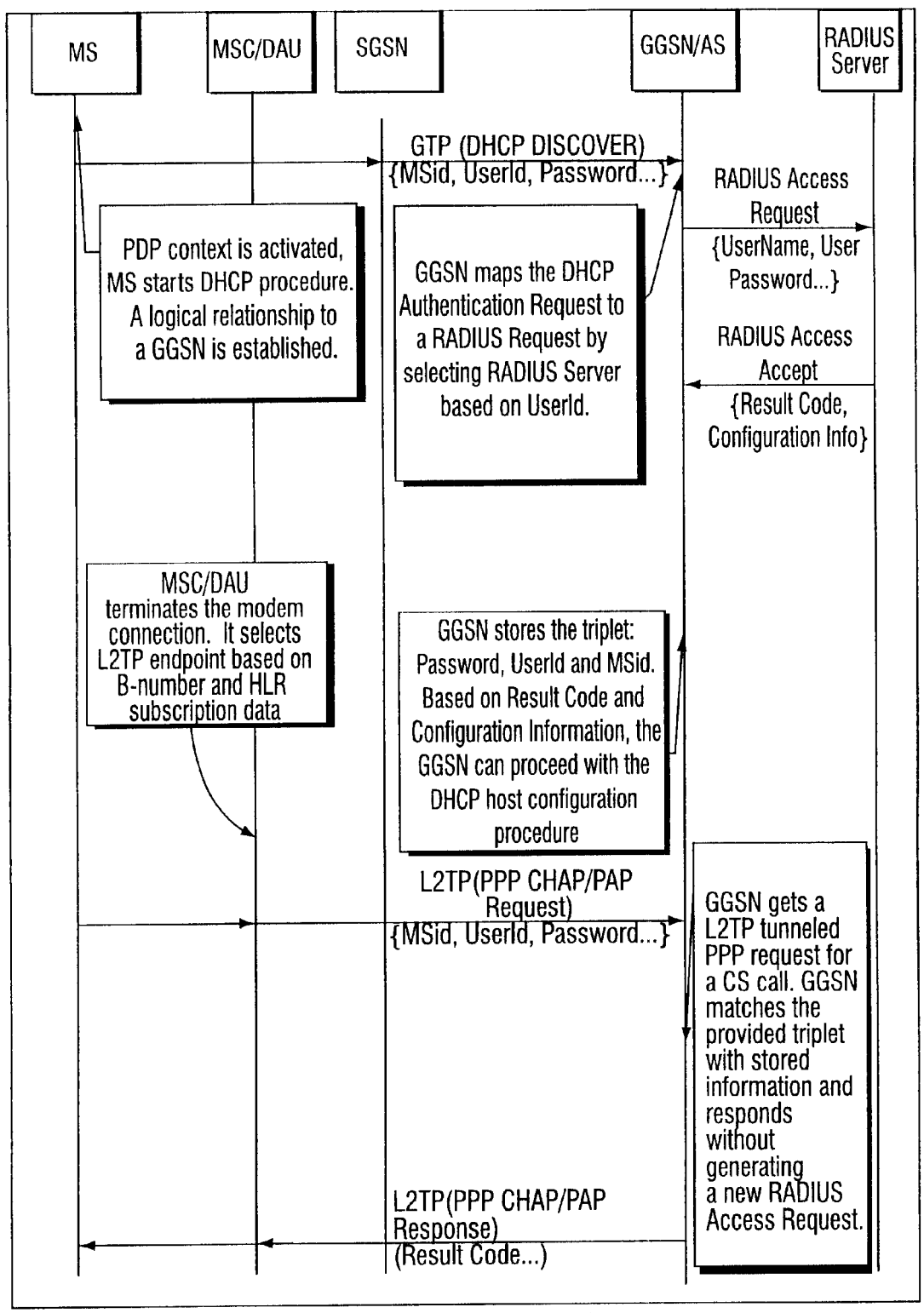
FIG. 12 is a message sequence showing an example of common authentication procedures for both circuit-switched and packet-switched services.

The common authentication procedure is now described in conjunction with FIG. 12 which shows an example messaging exchange between the various nodes in FIG. 9. Assuming that a PDP context has been requested by the mobile, created, and accepted by the GGSN, the mobile also starts the common dynamic host configuration procedure (interleaved with the common authentication procedure) to establish a logical relationship to the GGSN by sending a DHCP Discover message providing the mobile station's unique identifier (MSid), a user identifier (Userid), a password, and perhaps other parameters that may be used to identify and authenticate the mobile station.

The GGSN maps the DHCP authentication request to a Radius request by selecting a Radius authentication server 132 in the ISP 130 based on the Userid if the Userid has the form of User@ISP. Otherwise, a static mapping of user to ISP is applied in the GGSN. Assuming that the forwarded information is authentic, the Radius server 132 sends an Access Accept message with tunneling configuration information to the common access server in the GGSN. The tunneling configuration information is used by the GGSN to forward common host configuration messages and other IP packets towards the ISP. The GGSN stores the mobile station's MSid (which is based on the mobile's IMSI), Userid, and password and proceeds with the common host configuration procedure explained in more detail below. At this point, the common authentication procedure with the ISP is completed for both circuit-switched and packet-switched bearer services.

Still referring to FIG. 12, assume that a new application flow is started at the mobile station (e.g., an audio call from the mobile (party A) to a called party B) for which a circuit-switched bearer is selected. The direct access unit 112 in the MSC 110 terminates the modem connection corresponding to the circuit-switched bearer selected for that new application flow. The direct access unit 112 analyzes the B telephone number of the called party, and selects an L2TP endpoint based on that B number and HLR subscription data, i.e., the appropriate GGSN for connecting the call to B. The direct access unit 112 then sends an authentication request to the common access server at the selected GGSN, shown in the FIG. 12 example in the form of a password authentication protocol (PAP) or challenge authentication protocol (CHAP) request, to forward the mobile station's authentication parameters including the MSid, Userid, and password to the common access server.

Rather than performing another authentication procedure involving the external ISP, the MSid, Userid, and password received in the PAP/CHAP request are compared to values stored in the common access server during the initial authentication procedure. If the received values match those stored in the access server, an authentication confirmation is transmitted as a CHAP/PAP response through the direct access unit at the MSC to the mobile station. The common access server matches the provided information with the stored information and authenticates the mobile without having to undertake another authentication procedure with the radius server in the ISP. This same type of abbreviated authentication procedure is performed for other, subsequent application flows commenced during the session.

Figure 13:
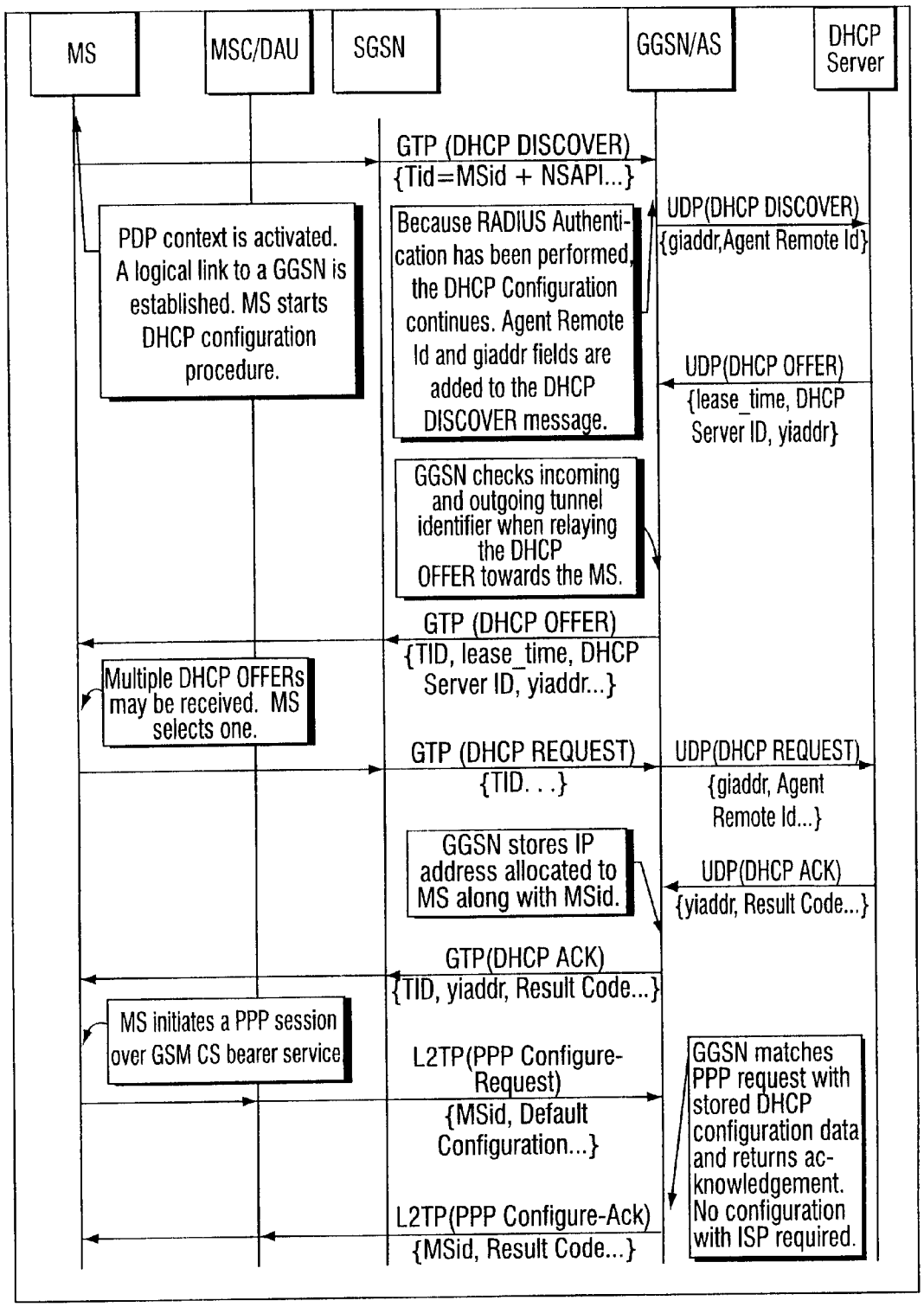
FIG. 13 is a messaging sequence showing an example, common IP host configuration for both circuit-switched and packet-switched bearer services.

The common access procedure further provides for a common IP host configuration procedure for both circuit-switched and packet-switched services as is now described in conjunction with the signaling sequence shown in FIG. 13. The IP host configuration is transparent to the bearer setup except for the inclusion of the DHCP configuration relay agent 120 in the GGSN. The DHCP relay agent 120 acts as an intermediary between the DHCP client 104 in the mobile station 102 and the DHCP server 134 in the ISP 130. The relay agent 120 secures message transfer between the DHCP client 104 and server 134 by adding an agent identifier (corresponding to the MSid) to each DHCP message sent to the DHCP configuration server 134 in the ISP. The configuration relay agent 120 later uses the agent identifier to filter out and stop packets to/from the mobile station that did not have the correct IP address in the header. The agent remote identifier (remote ID) and a subnet mask, and a gateway IP address (giaddr) which is an address that identifies the GGSN, are sent to the ISP 130 where they are checked and stored.

The ISP 130 uses the subnet mask and giaddr to route a response back to the GGSN, which in turn, forwards the response to the mobile station based on the agent remote ID. The agent remote ID also gives the ISP additional assurance that the mobile station is not "faking" its identity during the dynamic host configuration procedures. Accordingly, following the above-described common authentication procedure, the configuration relay agent 120 adds the GGSN's IP address to the giaddr field and relays the DHCP Discover message to the DHCP server.

The DHCP server 134 in the ISP replies to the Discover message with an Offer message passed on by the GGSN relay agent 120 towards the mobile station including the "offered" configurations that the DHCP server 134 can provide (after checking the incoming and outgoing tunnel identifiers). Multiple offers can be received from various DHCP servers. The mobile station selects the DHCP offer that best satisfies its requirements and sends a DHCP request message to the DHCP server which provided the selected offer. The DCHP server then provides an IP address to the GGSN in a DHCP Acknowledgment message. The IP address is placed in a table along with the mobile's agent remote ID and agent circuit ID/tunnel identifier.

The DHCP Acknowledge message is relayed to the mobile host which is configured with a set of selected DHCP parameters including IP address, DNS server name, etc. The common access server in the GGSN also stores these configuration parameters like the IP address allocated to the mobile station along with the authentication parameters like the MSid, Userid, password, etc.

Because the circuit-switched and packet-switched bearer services share the same IP termination/IP address in the mobile station, the common IP host configuration made over the packet-switched (GPRS) bearer service covers subsequent circuit-switched PPP sessions from the same mobile station using the circuit-switched bearer service. If the mobile station initiates a new application flow over a circuit-switched bearer, i.e., in the example shown in FIG. 13 by sending a PPP Configure-Request via an L2TP tunnel to the GGSN, the common access server compares the PPP Configure Request parameters including an MSid and default configuration parameters with the stored DHCP configuration information and returns an Acknowledgment if the comparison results in a match. Another configuration operation with the ISP DHCP server is not required. After this abbreviated configuration procedure, the common access server simply returns a PPP Configuration Acknowledgment via the direct access unit to the mobile station, and the selected circuit-switched bearer commences transporting the desired information.

The present invention combines both circuit-switched and packet-switched bearer services in order to provide enhanced and efficient applications to end users at lower cost. Both circuit-switched and packet-switched services can be applied when most appropriate to individual application flows. In addition, the present invention provides a common access procedure which makes accessing of external network entities such as ISPs much less costly and with remarkably short setup times. The initial authentication and configuration procedures between the common access server in the gateway node are performed only once at initial registration and are valid for both circuit-switched and packet-switched bearer services. Thereafter, only abbreviated authentication and configuration procedures are required between the mobile station and the common access server for subsequent new application flows.

While the present invention has been described with respect to particular embodiments, those skilled in the art will recognize that the present invention is not limited to the specific embodiments described and illustrated herein. Different formats, embodiments, and adaptations besides those shown and described, as well as many variations, modifications, and equivalent arrangements may also be used to implement the invention. For example, instead of the example GSM circuit-switched network described above, a Wireless Local Area Network (WLAN) or a Digital Audio/Video Broadcast (DAB/DVB) might be used. Similarly, other packet-switched networks might be used. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed:

1. In a mobile communications network providing circuit-switched (CS) and packet-switched (PS) services, a method comprising:

a mobile station establishing a communication with the mobile communications network during which plural flows associated with an application are communicated between the mobile station and an external network entity;

including an indicator in each packet of information in each of the plural application flows indicating whether a circuit-switched bearer or a packet-switched bearer should be used to carry that packet;

for each of the plural application flows, determining whether a circuit-switched bearer or a packet-switched bearer from the mobile station toward the external network entity should be established including selecting one of the circuit-switched and packet-switched bearers to carry each packet based on the indicator in each packet; and allocating the determined bearer to each of the plural application flows.

2. The method in claim 1, wherein each application flow is associated with a corresponding quality of service request, the method further comprising:

for each of the plural application flows, determining based on the corresponding requested quality of service whether a circuit-switched bearer or a packet-switched bearer is better suited to bear the application flow.

3. The method in claim 2, further comprising:

for the application flow, reserving resources available in the mobile communications network to support the requested quality of service and a selected one of the circuit-switched and packet-switched bearers.

4. The method in claim 1, wherein the indicator is the same for all packets in an application flow when resources are reserved for the application flow.

5. The method in claim 1, wherein the indicator is a class indicator based on one of plural service classes with all packets of the same service class being carried on the type of bearer determined by the class indicator.

6. The method in claim 1, further comprising:

establishing an accounting record that stores accounting information for both circuit-switched and packet-switched bearer services provided to a mobile station.

7. The method in claim 1, further comprising:

for each of the plural application flows, determining whether the application flow requests a real time type of service or a non-real time service, allocating a circuit-switched bearer if the request is for a real time type of service and a packet-switched bearer if the request is for a non-real time type of service.

8. The method in claim 7, wherein real time services include one or both of audio and video services and non-real time services include one or more of file transfer, e-mail, retrieval of information from the world wide web, and telemetry applications.

9. The method in claim 1, further comprising:

allocating a circuit-switched bearer if the application flow requests low delay or small jitter and a packet-switched bearer if the application flow requests fast channel access or bursty data transfer capability.

10. The method in claim 1, wherein the mobile station is a class B mobile station that can transmit or receive only one type of bearer at a time, the method further comprising:

determining if a circuit-switched bearer to the mobile station exists for an application flow, and if so, sending packet-switched information over the existing circuit-switched bearer.

11. The method in claim 1, wherein the external network entity is the Internet, and the external network entity is an Internet Service Provider (ISP), the method further comprising:

providing a link layer service to a network layer in the mobile communication network where circuit-switched and packet-switched bearers are separately allocated to carry different application flows associated with the mobile station.

12. The method in claim 11, wherein the application determines whether a circuit-switched or a packet-switched bearer should be selected for each application flow and requests the selected bearer from the IP link layer service.

13. The method in claim 12, wherein the IP link layer service is provided in the mobile station and at a mobile network gateway node that interfaces with the ISP.

14. The method in claim 1, wherein the mobile station monitors channels for both circuit-switched and packet-switched services.

15. The method in claim 14, wherein the mobile station operates on only one or both of the circuit-switched and packet-switched services at one time.

16. In a mobile communications network providing circuit-switched (CS) and packet-switched (PS) services, a method comprising:

a mobile station establishing a communication with the mobile communications network during which plural flows associated with an application are communicated between the mobile station and an external network entity;

for each of the plural application flows, determining whether a circuit-switched bearer or a packet-switched bearer from the mobile station toward the external network entity should be established; and allocating the determined bearer to each of the plural application flows including allocating a packet-switched bearer to carry an application flow containing session control operation information.

17. In a mobile communications network providing circuit-switched (CS) and packet-switched (PS) services, a method comprising:

a mobile station establishing a communication with the mobile communications network during which plural flows associated with an application are communicated between the mobile station and an external network entity;

for each of the plural application flows, determining whether a circuit-switched bearer or a packet-switched bearer from the mobile station toward the external network entity should be established including for each of the plural application flows, determining an amount of information to be sent and a setup delay sensitivity;

allocating a circuit-switched bearer if a large amount of information is to be sent or if the application flow is non-sensitive to setup delay; and otherwise, allocating a packet-switched bearer.

18. In a mobile communications network providing circuit-switched (CS) and packet-switched (PS) services, a method comprising:

a mobile station establishing a communication with the mobile communications network during which plural flows associated with an application are communicated between the mobile station and an external network entity;

detecting plural quality of service parameters requested by an individual application flow;

assigning different levels of significance to different ones of the quality of service parameters; and determining the bearer for the individual application flow giving priority to quality of service parameters having a greater level of significance; and allocating the determined bearer for each of the plural application flows.

19. In a mobile communications system including a circuit-switched mobile network and packet-switched mobile network, a method comprising:

a mobile station establishing a communication session with the mobile communications network during which plural flows of an application are communicated between the mobile station and an external network entity, each application flow having a corresponding quality of service request;

mapping individual ones of the application flows to one of the circuit-switched network and the packet-switched network depending on the quality of service corresponding to each of the individual application flows; and mapping quality of service parameters requested for a corresponding individual application flow into circuit-switched parameters if the application flow is mapped to the circuit-switched network and into packet-switched parameters if the application flow is mapped to the packet-switched network.

20. The method in claim 19, the mapping step further comprising:

allocating a circuit-switched network link to one of the application flows if the circuit-switched network is selected, and allocating a packet-switched network link to the one application flow if the packet-switched network is selected.

21. The method in claim 19, wherein the mobile communications system is the GSM system, the circuit-switched network is the GSM circuit-switched network, and the packet-switched network is the GSM GPRS network.

22. In a mobile communications network providing circuit-switched (CS) and packet-switched (PS) services, a method comprising:

a mobile station establishing a communication with the mobile communications network during which plural flows associated with an application are communicated between the mobile station and an external network entity;

for each of the plural application flows, determining whether a circuit-switched bearer or a packet-switched bearer from the mobile station toward the external network entity should be established;

allocating the determined bearer to each of the plural application flows; and performing a common access procedure between the mobile station and the external network entity for both the circuit-switched and packet-switched networks, wherein after the common access procedure, a subsequent application flow is established between the mobile station and the external network entity for the communication session without performing another access procedure involving the external network entity.

23. The method in claim 22 wherein the common access procedure includes a common authentication procedure for authenticating the identity of the mobile station with the external network entity, whereafter the mobile station is authorized for the subsequent application flow through both of the circuit-switched and packet-switched networks.

24. The method in claim 23, wherein the common authentication procedure includes confirming an identification and a password of the mobile station to determine whether the mobile station is authorized to communicate with and use services of the external network entity.

25. The method in claim 23, wherein for the subsequent application flow, only an abbreviated authentication procedure is performed in the mobile network.

26. The method in claim 23, wherein after the common authentication procedure, a subsequent application flow is established with the external network entity without performing another authentication procedure involving the external network entity.

27. The method in claim 26, further comprising:

storing one or more parameters resulting from the common authentication procedure in a node in the mobile communication system, and for the subsequent application flow, comparing the stored one or more parameters with an authentication request associated with the subsequent application flow, wherein if the comparison results in a match, the subsequent application flow is authenticated.

28. The method in claim 27, wherein the one or more parameters include an IP address from the external network entity, a domain name server identifier, a worldwide web server identifier, and a conference gatekeeper.

29. The method in claim 22, wherein the common access procedure includes a common configuration procedure for configuring the mobile station with the external network entity, whereafter the mobile station is configured with a common network address for the subsequent application flow through both of the circuit-switched and packet-switched networks.

30. The method in claim 29, wherein the common configuration procedure includes:

providing the mobile station with parameters needed to communicate with the external network entity including a network layer address assigned to the mobile station by the external network entity, and storing the parameters in the mobile communications network, wherein for the subsequent application flow, the method further comprises:

retrieving the stored parameters to configure the subsequent application flow without involving the external network entity.

31. The method in claim 22, wherein the mobile communications system includes a gateway node for interfacing with the external network entity, the method further comprising:

registering the mobile station with the gateway node, and the mobile station requesting an end-to-end configuration between the mobile station and the external network entity, wherein the end-to-end configuration request establishes a network layer bearer between the mobile host and the gateway node permitting relay of data packets between the external network entity and the mobile host even though a network layer address is not assigned to the mobile host.

32. The method in claim 31, wherein the gateway node functions as a dynamic host configuration relay agent serving the mobile station as a client and relays information between the mobile station and the external network entity.

33. The method in claim 32, further comprising:

adding a remote agent identification corresponding to a mobile station identifier to messages intended for the external network entity.

34. The method in claim 33, wherein during configuration, the dynamic host configuration agent captures and stores a unique network layer address for the mobile station for the established session and all application flows activated during the established session.

35. The method in claim 34, further comprising:

establishing a data communications tunnel corresponding to the network layer bearer between the gateway node and the mobile station, and establishing a relationship in the gateway node between a mobile station's identifier, the established tunnel, and the network layer address for the mobile station for the established session.

36. For use in a mobile communications system including a mobile communications network providing circuit-switched (CS) and packet-switched (PS) services, apparatus comprising:

means for establishing a communication between a mobile station and the mobile communications network during which plural flows associated with an application are communicated between the mobile station and an external network entity;

for each of the plural application flows, means for determining whether a circuit-switched bearer or a packet-switched bearer through the mobile communications network toward the external network entity should be established;

means for including an indicator in each packet of information in the application flow indicating whether a circuit-switched bearer or a packet-switched bearer should be used to carry that packet; and means for allocating the determined bearer to each of the plural application flows including selecting one of the circuit-switched and packet-switched bearers to carry each packet based on the indicator in each packet.

37. The apparatus in claim 36, wherein each application flow is associated with a corresponding quality of service request, the means for determining further determining for each of the plural application flows, based on the corresponding requested quality of service, whether a circuit-switched bearer or a packet-switched bearer is better suited to bear the application flow.

38. The apparatus in claim 37, further comprising:

means for reserving resources available in the mobile communications network to support the requested quality of service and a selected one of the circuit-switched and packet-switched bearers for each application flow.

39. The apparatus in claim 36, wherein the indicator is the same for all packets in an application flow when resources are reserved for the application flow.

40. The apparatus in claim 36, wherein the indicator is a class indicator based on one of plural service classes with all packets of the same service class being carried on the type of bearer determined by the class indicator.

41. The apparatus in claim 36, further comprising:

means for establishing an accounting record that stores accounting information for both circuit-switched and packet-switched bearer services provided to a mobile station.

42. The apparatus in claim 36, further comprising:

for each of the plural application flows, means for determining whether the application flow requests a real time type of service or a non-real time service, wherein means for allocating allocates a circuit-switched bearer if the request is for a real time type of service and a packet-switched bearer if the request is for a non-real time type of service.

43. The apparatus in claim 42, further comprising:

wherein means for allocating allocates a packet-switched bearer to carry an application flow containing session control operation information.

44. The apparatus in claim 42, wherein real time services include one or both of audio and video services and non-real time services include one or more of file transfer, e-mail, retrieval of information from the world wide web, and telemetry applications.

45. The apparatus in claim 36, wherein the means for allocating allocates a circuit-switched bearer if the application flow requests low delay or small jitter and a packet-switched bearer if the application flow requests fast channel access or bursty data transfer capability.

46. The apparatus in claim 36, wherein the mobile station is a class B mobile station that can transmit or receive only one type of bearer at a time, further comprising:

means for determining if a circuit-switched bearer to the mobile station exists for an application flow, and if so, for sending packet-switched information over the existing circuit-switched bearer.

47. The apparatus in claim 36, wherein the external network is the Internet, and the external network entity is an Internet Service Provider (ISP), further comprising:

means for providing a link layer service to a network layer in the mobile communication network where circuit-switched and packet-switched bearers are separately allocated to carry different application flows associated with the mobile station.

48. The apparatus in claim 47, wherein the application determines whether a circuit-switched or a packet-switched bearer should be selected for each application flow and requests the selected bearer from the IP link layer service.

49. The apparatus in claim 47, wherein the IP link layer service is provided in the mobile station and at a mobile network gateway node that interfaces with the ISP.

50. The apparatus in claim 36, wherein the mobile station monitors channels for both circuit-switched and packet-switched services.

51. The apparatus in claim 50, wherein the mobile station operates on only one or both of the circuit-switched and packet-switched services at one time.

52. The apparatus in claim 36, wherein the apparatus is implemented in the mobile station.

53. The apparatus in claim 36, wherein the apparatus is implemented in a node in the mobile communications network.

54. For use in a mobile communications system including a mobile communications network providing circuit-switched (CS) and packet-switched (PS) services, apparatus comprising:

means for establishing a communication between a mobile station and the mobile communications network during which plural flows associated with an application are communicated between the mobile station and an external network entity;

for each of the plural application flows, means for determining whether a circuit-switched bearer or a packet-switched bearer through the mobile communications network toward the external network entity should be established, an amount of information to be sent, and a setup delay sensitivity; and means for allocating the determined bearer to each of the plural application flows, wherein the means for allocating allocates a circuit-switched bearer if a large amount of information is to be sent or if the application flow is non-sensitive to setup delay, and otherwise, allocating a packet-switched bearer.

55. For use in a mobile communications system including a mobile communications network providing circuit-switched (CS) and packet-switched (PS) services, apparatus comprising:

means for establishing a communication between a mobile station and the mobile communications network during which plural flows associated with an application are communicated between the mobile station and an external network entity;

for each of the plural application flows, means for determining whether a circuit-switched bearer or a packet-switched bearer through the mobile communications network toward the external network entity should be established;

means for detecting plural quality of service parameters requested by an individual application flow; and means for assigning different levels of significance to different ones of the quality of service parameters, wherein the means for determining determines the bearer giving priority to quality of service parameters having a greater level of significance.

56. For use in a mobile communications system including a circuit-switched mobile network and packet-switched mobile network, apparatus comprising:

electronic circuitry configured to establish a communication session with the mobile communications network during which plural flows of an application are communicated between a mobile station and an external network entity, each application flow having a corresponding quality of service request, and a mapper for mapping individual ones of the application flows to one of the circuit-switched network and the packet-switched network depending on the quality of service corresponding to each of the individual application flows.

57. The apparatus in claim 56, wherein the mapper is configured to allocate a circuit-switched network link to the application flow if the circuit-switched network is selected, and to allocate a packet-switched network link to the application flow if the packet-switched network is selected.

58. The apparatus in claim 56, wherein the mobile communications system is the GSM system, the circuit-switched network is the GSM circuit-switched network, and the packet-switched network is the GSM GPRS network.

59. The apparatus in claim 56, wherein the apparatus is implemented in the mobile station.

60. The apparatus in claim 56, wherein the apparatus is implemented in a node in the mobile communications system.

* * * * *